(12) United States Patent
Forte

(10) Patent No.: US 8,134,327 B2
(45) Date of Patent: Mar. 13, 2012

(54) PHASE CURRENT MEASUREMENTS IN A THREE PHASE INVERTER USING A SINGLE COMMON DC-LINK CURRENT SENSOR

(75) Inventor: Gianlugi Forte, Camporotondo Etneo (IT)

(73) Assignee: STMicroelectronics S.R.L., Agrate Brianza (MI) (IT)

( * ) Notice: Subject to any disclaimer, the term of this patent is extended or adjusted under 35 U.S.C. 154(b) by 421 days.

(21) Appl. No.: 12/435,703

(22) Filed: May 5, 2009

(65) Prior Publication Data

US 2009/0284194 A1 Nov. 19, 2009

(30) Foreign Application Priority Data

May 13, 2008 (EP) ..................................... 08425332

(51) Int. Cl.
*G05B 11/28* (2006.01)
(52) U.S. Cl. ........................ 318/599; 318/811
(58) Field of Classification Search .................. 318/599, 318/811, 798, 799, 801, 802, 810
See application file for complete search history.

(56) References Cited

U.S. PATENT DOCUMENTS

| | | | |
|---|---|---|---|
| 4,602,201 A * | 7/1986 | Edwards ........................ | 318/811 |
| 6,534,949 B2 * | 3/2003 | Szczesny et al. ............ | 318/801 |
| 7,190,135 B2 * | 3/2007 | Collier-Hallman ...... | 318/400.01 |
| 7,308,192 B2 * | 12/2007 | Williams et al. .............. | 388/819 |
| 2005/0206341 A1 | 6/2005 | Yin Ho ......................... | 318/812 |
| 2007/0216344 A1 | 9/2007 | Welchko et al. .............. | 318/811 |

FOREIGN PATENT DOCUMENTS

WO 03/084044 A2 10/2003

OTHER PUBLICATIONS

Blaabjerg, F. et al., "Single Current Sensor Technique in the DC Link of a Three-phase PWM-Vs Inverters: A Review and a Novel Solution," IEEE Transactions on Industry Applications, IEEE Service Center, Piscatway, NJ, vol. 33, No. 5, Sep. 1, 1997, pp. 1241-1253.

* cited by examiner

*Primary Examiner* — Rina Duda
(74) *Attorney, Agent, or Firm* — Allen, Dyer, Doppelt, Milbrath & Gilchrist, P.A.

(57) ABSTRACT

A method for measuring current in each phase of a three-phase inverter driven motor is based on the three-phase inverter being controlled in a PWM mode by three PWM signals including the use of a common DC-link current sensing resistor. The current on the sensing resistor is intermittently sampled. The method includes determining a modulation index for the voltage demand set by a motor controller. Based on specific mutual duty cycle conditions of the three PWM phase driving signals, sampling windows of sufficient duration are created for allowing distinct sampling of two of the phase currents.

22 Claims, 22 Drawing Sheets

PHASE CURRENT MEASUREMENTS IN A THREE PHASE INVERTER USING A SINGLE COMMON DC-LINK CURRENT SENSOR

FIELD OF THE INVENTION

This invention relates in general to three-phase power devices, for example, a three-phase permanent magnet synchronous motor or induction motor driving inverters, and, in particular, to an improved method of distinctly measuring phase currents using a single common direct current link current sensor.

BACKGROUND OF THE INVENTION

The phase windings of a three-phase motor may be controlled using pulse width modulated (PWM) signals. Typically, the PWM control signals are applied to a three-phase inverter. The switching devices of the three-phase inverter connect the phase winding taps of the motor to either a positive or a negative power supply voltage rail and to ground.

For proper control of the motor, it is typical to measure the current flowing through each phase winding. The phase current measurements are provided to a controller that generates the PWM drive signals that control the switching devices of the three-phase inverter. Traditionally, the phase current information was obtained by distinctly sensing the voltage drop on a resistor in series with each phase winding. In order to reduce costs, phase current sensing may be carried out only on two of the three phases of the motor in view of the fact that the sum of all currents flowing through the motor windings will be zero and knowing the current flowing through two of the phases permits determination with good accuracy of the current flowing through the third phase, thus saving a sensor.

More recently, methods have been disclosed based on the use of a single sensing resistor connected in a direct current (DC) link connection between the power supply and the inverter. Depending on the state of the output power switches of the inverter, the current of at least two of the three phases may be distinctly measured on the single common DC-link current sensing resistor.

Of course, to sense the current separately for at least two of the three phases, the states of the output power switches of the three phase inverter define, during each PWM period, an interval in which the current flowing in the common DC-link current sensing resistor is that of only one active phase at the time. Unfortunately, these enabling conditions may no longer be present under unfavorable duty cycle conditions of the PWM signals and special techniques for creating "sampling windows" of adequate duration for allowing distinct sampling of at least two of the three phase currents during a PWM period have been disclosed.

Advanced PWM schemes, such as the space vector pulse width modulation (SVPWM) have been made possible by modern digital signal processors (DSP). By enhancing the output voltage level compared to conventionally known sinusoidal drive waveform pulse width modulation schemes, these new modulation techniques make it even more complex to measure phase currents with a single common DC-link sensing resistor. A particular situation is when the amplitude of the voltage demand vector becomes very small, i.e. small index of modulation. Another situation is when the voltage demand vector comes to lie in a near-boundary region between two adjacent sectors of the typical circular voltage vector space representation.

Several strategies have been disclosed for permitting the separate current measurements, even under critical conditions of PWM driving, of the switches of the output three-phase inverter.

The International Publication No. WO 96/23347 to Nielson et al. describes a method of measuring phase currents in an inverter based on carrying out two measurements of one phase current and two measurements of another phase current, each time sampling at the middle of the time interval of the related switching phase. The symmetry of the modulation pattern permits for the pair of mean values generated by the repeated measurements to be related to the center of the modulation period.

U.S. Patent Application Publication No. 2003/0173946 to Liu et al. discloses a method based on sampling the current during blind intervals of the control signal by suitably shifting it to create appropriate sampling windows while keeping fixed the duty cycle of the PWM phase drive signal. U.S. Patent Application Publication No. 2005/226607 to Williams et al. discloses a method of measuring phase currents on a single current sensor, based on reconstructing the voltage demand vector with a linear combination of two or more state vectors corresponding to different configurations of the states of the switches of the three-phase inverter.

U.S. Patent Application Publication No. 2005/226607 to Williams et al. also discloses a current measurement method using a single sensor based on defining a voltage demand vector where more than two state vectors are used to meet the minimum time requirement of the single current sensor and calculating three or more state vectors that produce the voltage demand vector, for allowing distinct phase current sensing during a PWM period. There is a continuing need for reducing processing complexity and improving accuracy of phase current measurements using a single common DC-link sensing resistor.

SUMMARY OF THE INVENTION

In view of the foregoing background, an object of the present invention is to provide a method for measuring current in each phase of a three phase inverter driven motor, controlled in a PWM mode by three PWM signals. This and other objects, advantages and features in accordance with the present invention is provided by a method using a relatively straightforward determination of the modulation index for the voltage demand set by the motor controller, specific mutual duty cycle conditions of the three PWM phase driving signals and by a consequent choice of the way "sampling windows" of sufficient duration for allowing to sample distinctly two phase currents are provided for optimal performance.

A method is for sampling data in each phase of a three-phase inverter of a motor. The three-phase inverter is controlled by three pulse width modulated (PWM) signals with corresponding duty cycles and a single common direct current (DC)-link current resistor sampling a DC-link current. The method includes computing an index of modulation for each of the three PWM signals for a current demand voltage vector and comparing it with a threshold value. The method also includes if the respective duty cycle of one of the three PWM signals differs from the duty cycle of the other two PWM signals by less than a minimum value, then determining which of the following three conditions is occurring: a) the duty cycles of at least two of the PWM signals differ by less than the minimum value and the duty cycle of the third PWM signal is greater than that of the other two, b) the duty cycles of at least two of the PWM signals differ by less than the minimum value and the duty cycle of the third PWM signal is smaller than that of the other two, or c) the duty cycles of the three PWM signals differ among each other by less than the minimum value.

The method also includes upon occurrence of at least one of the conditions a), b), and c), creating sampling windows for distinctly sampling at least two phase currents by performing at least one of: inverting and complementing at least one of the PWM signals, and inserting a fixed time active vector in null sub-intervals of at least one of the PWM signals and maintaining a compound duty cycle over every PWM period of the affected signal while being based upon the comparison of the index of modulation with the threshold value and from which of said three conditions applies.

Furthermore, when at least one of conditions a) and b) is true and when the modulation index is greater than the threshold value, then the PWM signal being inverted and complemented for maintaining its duty cycle is the signal of median duty cycle among the three PWM signals. Also, when either condition c) is true or when the modulation index is greater than the threshold value, then a second PWM signal is inverted and complemented alternately to the signal of median duty cycle among the three PWM signals during successive PWM periods.

Yet further, when condition c) is true and the modulation index is greater than the threshold value, then a first phase current measurement is made by inverting and complementing the PWM signal of median duty cycle and at least one other phase current measurement is made by decrementing the duty cycle of a second PWM signal by a set amount during a PWM period and incrementing its duty cycle by the set amount during a successive PWM period.

DETAILED DESCRIPTION OF THE PREFERRED EMBODIMENTS

Figure 1:
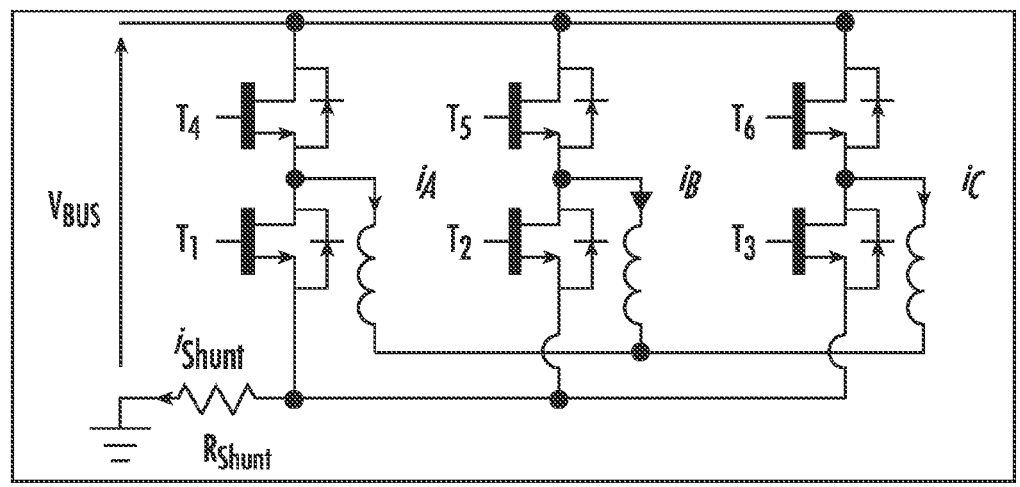
FIG. 1 is a basic circuit diagram of a three-phase inverter bridge, according to the prior art.

A classical three-phase inverter bridge includes of six power switches $T_1, T_2, T_3, T_4, T_5, T_6$ is shown in FIG. 1. The three inductors driven by the respective half bridges (or bridge legs) represent the three phase windings constituting the stator of the motor, in which the phase currents $i_A$, $i_B$ and $i_C$ flows. A single common current sensing resistor $R_{shunt}$ connected in the DC-link allows sensing the DC current $i_{shunt}$ that is absorbed from the power supply bus at the supply voltage $V_{bus}$. Phase currents are assumed positive when flowing from the inverter output nodes to the windings, the DC current $i_{shunt}$ is assumed positive when flowing toward the common ground node of the circuit.

According to common practice, complementary PWM signals control the high side and the low side switches of each leg of the three-phase bridge, necessarily with dead time insertions to exclude risks of simultaneous turned-on states of the two switches of the three legs of the inverter bridge that would result in a potentially damaging short-circuit across the DC bus. As known to the skilled person, the inductive character of the load and the consequent phase lag between current voltage causes an unrecoverable reduction of the resulting peak-to-peak voltage of the 120° electrically out-phased voltage waveforms (generally sinusoids) that are produced on the phase windings driven by the respective PWM signals applied between the connection taps of the windings and ground. The signal $T_4$ is the complementary signal of $T_1$, $T_5$ is the complementary signal of $T_2$, and $T_6$ is the complementary signal of $T_3$. Therefore, when defining the PWM driving signals $T_1, T_2, T_3$ and also the respective complementary signals $T_4, T_5$ and $T_6$ are implicitly defined, and vice versa.

The method of the present disclosure is illustrated for the case of a control system of a three-phase motor employing the so-called space vector modulation technique. However, the disclosed method of phase current measurements is applicable similarly to any other type of three-phase PWM controlled drive technique.

For each configuration of the low-side switches of the three legs of the inverter bridge, the current that flows in the common single sensing resistor $R_{shunt}$ connected in the DC-link to the common ground node of the circuit is indicated in Table 1 below. In the Table, the "0" value means that the switch is open, while the value "1" means that the switch is closed.

TABLE 1

| V | $T_1$ | $T_2$ | $T_3$ | $i_{Shunt}$ |
|---|---|---|---|---|
| $V_0$ | 0 | 0 | 0 | 0 |
| $V_1$ | 0 | 1 | 1 | $i_A$ |
| $V_2$ | 0 | 0 | 1 | $-i_C$ |
| $V_3$ | 1 | 0 | 1 | $i_B$ |
| $V_4$ | 1 | 0 | 0 | $-i_A$ |
| $V_5$ | 1 | 1 | 0 | $i_C$ |
| $V_6$ | 0 | 1 | 0 | $-i_B$ |
| $V_7$ | 1 | 1 | 1 | 0 |

In a vector reference system of the stator, also called the α-β plane, each configuration of the low side switches $T_1, T_2$ and $T_3$ define what is called a state vector, with the exception of the (000) and (111) configurations that define two "null" vectors, namely: $V_0$ and $V_7$, representing the situation in which all the three phase winding taps are connected to ground and to the supply rail, respectively.

There are different alignment strategies of the three PWM signals that may be alternatively adopted. One is the so-called center aligned pattern, according to which the ON-time of each phase is centered about the mid point of the PWM period. In other words, in each PWM period of a timing diagram of the three PWM drive signals, there is an ideal mid point line such that all the rising edges of the three PWM signals that control the switches are at the left of the line and all the falling edges are at the right of the line. The other alignment strategy is the so-called edge aligned pattern, wherein the high side switches of all the legs of the inverter bridge are turned on simultaneously at the start of each PWM period.

For the ease of illustration, the method of the present disclosure may be described for applications adopting a center aligned pattern. Although the description may refer to the case of center aligned patterns, the considerations that may be made would hold also for edge aligned patterns.

Figure 2:
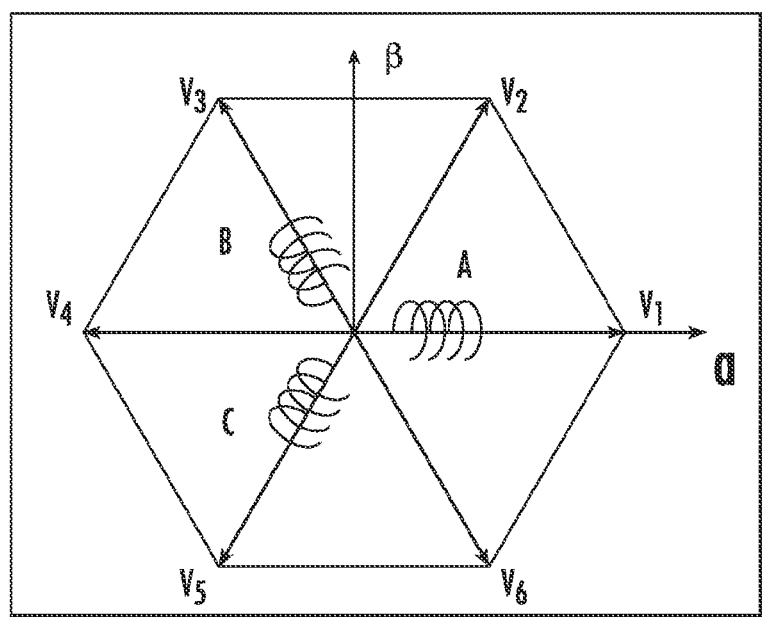
FIG. 2 is a graphic representation of the vector space for the space vector pulse width modulation (SPWM), according to the prior art.

FIG. 2 is the usual illustration of the so-called Space Vector Modulation (SVM) diagram, the state vectors $V_1$ to $V_6$ having the indicated directions and their length or magnitude (modulus) representing the time spent (designated TPWM) by the switches in the respective state during each PWM period, i.e. their duty cycle.

Referring to the illustration of the SVM diagram of FIG. 2, any desired voltage on the phase windings of the stator may be represented as a point on the polar diagram of FIG. 2, which corresponds to a so-called "voltage demand vector" of a certain direction and magnitude in the α-β plane of the SVM diagram that can be produced by an appropriate combination of two or even more state vectors, the length of which represents the time spent by the appropriate switches in the respective state during each PWM period.

Generally, any point within the hexagonally sectored vector space of FIG. 2 may be "reached" from the center of the polar diagram by two or even more state vectors, the lengths of which when added together may be equal to or generally less than the "voltage demand vector" set by the motor controller. Any demand voltage vector for every PWM period may theoretically be attainable by switching sequentially one to two selected state vectors of the switches (Table 1), each for an appropriate time interval during the PWM period, i.e. each according to a duty cycle set by the motor controller. Such an SVPWM control technique has in practice certain restrictions of the variable range of possible demand voltage vectors because of the above recalled electrical behaviors and limitations as may emerge from the ensuing description.

Figure 3:
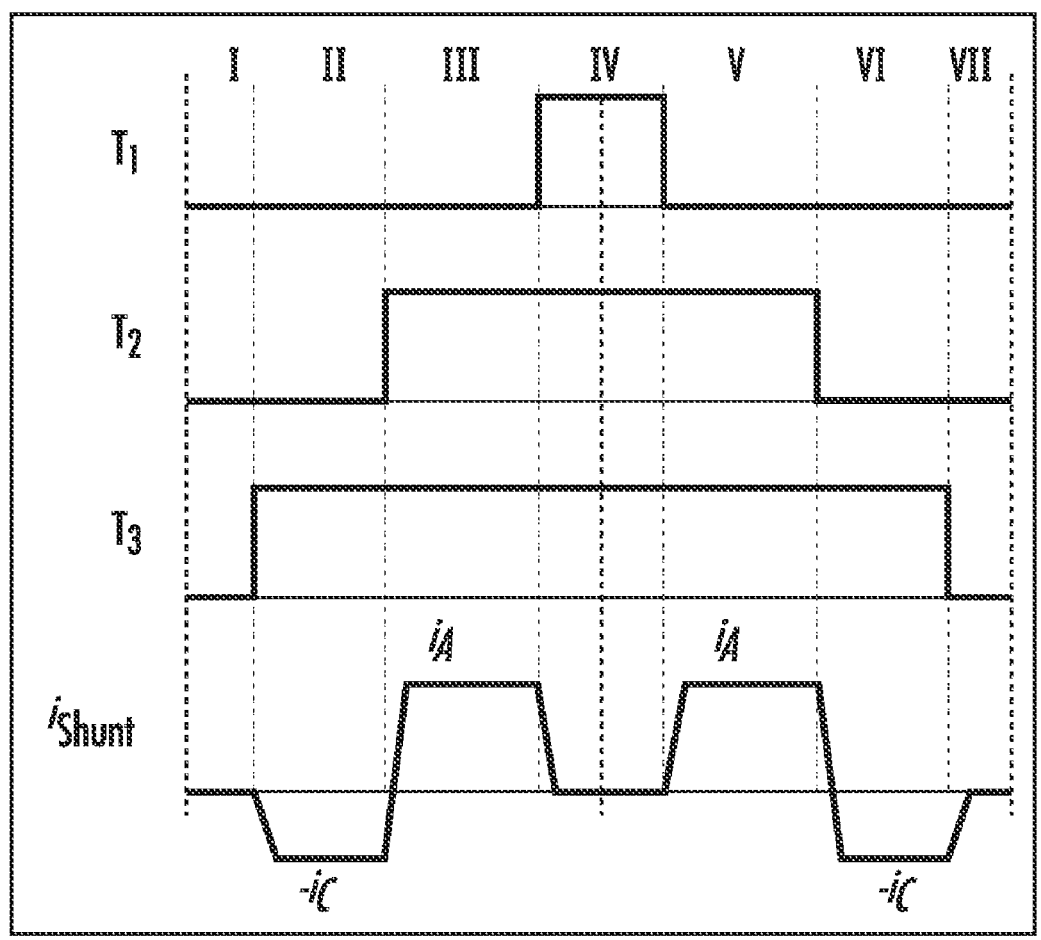
FIG. 3 depicts a commonly used representation of the PWM controlled low side switches of the three-phase inverter and the corresponding pattern of the current flowing in the common DC-link current sensing resistor according to so called center aligned pattern, according to the prior art.

Using a center aligned pattern, each PWM period may be considered divided in seven sub-periods, as exemplarily depicted in FIG. 3. In three sub periods, namely in I, IV and VII of the timing diagram of FIG. 3, the current flowing in the single common DC-link current sensing resistor is null. In the remaining sub periods, the current flowing in the single common DC-link current sensing resistor is symmetrical in respect to the mid point of the PWM period.

In the condition depicted by way of example in FIG. 3 there are:

sub periods II and VI in which the $i_{shunt}$ is equal to $-i_C$ and
sub periods III and V in which the $i_{shunt}$ is equal to $i_A$ Therefore, in a "regular" or non critical mutual duty cycle condition of the three PWM signals of FIG. 3 it is possible to reconstruct the three stator currents from sampled values of the voltage drop in the current sensing resistor $R_{shunt}$:

$i_A$ is $i_{shunt}$ sampled in sub periods III or V
$i_C$ is $(-i_{shunt})$ sampled in sub periods II or VI
$i_B = (-i_A - i_C)$ (calculated).

Given that the value TMIN is the minimum time used by the control system to perform the sampling of the voltage drop on the single common DC-link current sensing resistor;

such a limit time value defines a fundamental parameter of the strategy of phase current data acquisition by the control system of the motor. The value of TMIN converts in a duty cycle percentage, defined DMIN, according to the following relation:

$$DMIN = \left(\frac{TMIN}{TPWM}\right) \cdot 100 = (TMIN \cdot FPWM) \cdot 100$$

Discussion will now be directed to computation and comparison of the modulation index with minimum threshold and classification of the three-phase PWM patterns. According to an aspect of the method of the present disclosure, the magnitude (modules) of the current demand voltage set by the motor controller is calculated in terms of index modulation of the three-phase PWM drive signals and the current value of the modulation index is compared with a minimum threshold value and the mutual duty cycle condition of the three PWM signals is assessed by the data acquisition subsystem of the control system of the motor.

Figure 4:
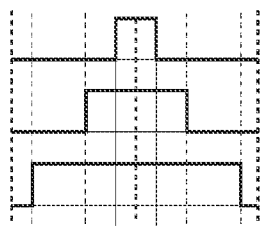
FIGS. 4 to 7 illustrate a non critical (regular) PWM pattern, a first critical PWM pattern condition, a second critical PWM pattern condition and a third critical PWM pattern condition, respectively, according to the present invention.

The condition depicted in FIG. 3, commented above and reproduced in FIG. 4, is characterized in that the three duty cycles differ from each other by more than DMIN, whereby as already discussed above, phase currents may be distinctly sampled during each PWM period, determining the current in the un-sampled third phase by simple calculation. This condition is assessed as "regular" or not critical by the phase current data acquisition system, not requiring any intervention on any of the three PWM signals.

Figure 5:
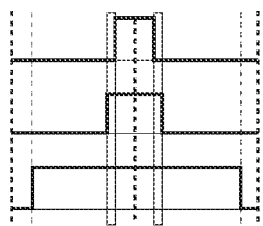
Figure 6:
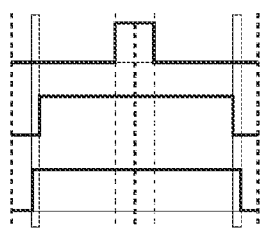
Figure 7:
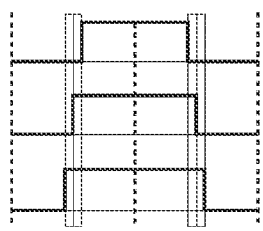

FIG. 5 exemplifies a first critical condition a) wherein the duty cycles of two of the PWM signals differ by a quantity less than the quantity DMIN that is represented by the shaded areas, and the third PWM signal has a duty cycle greater than the other two. FIG. 6 exemplifies a second critical condition b) wherein the duty cycles of two of the three PWM signals differ by a quantity less than DMIN and the third PWM signal has a duty cycle smaller than the other two. FIG. 7 exemplifies a third critical condition c) wherein the duty cycle of all the three PWM signals differ from the others by quantity less than DMIN. The phase current data acquisition system discriminates among the above-described three different critical conditions.

Although under any of the three critical conditions it is not possible to sample distinctly the phase current of at least two phases on a single common DC-link current sensing resistor, the above indicated critical conditions as recognized by the phase current data acquisition system determine different effects that is worth analyzing.

Figure 8:
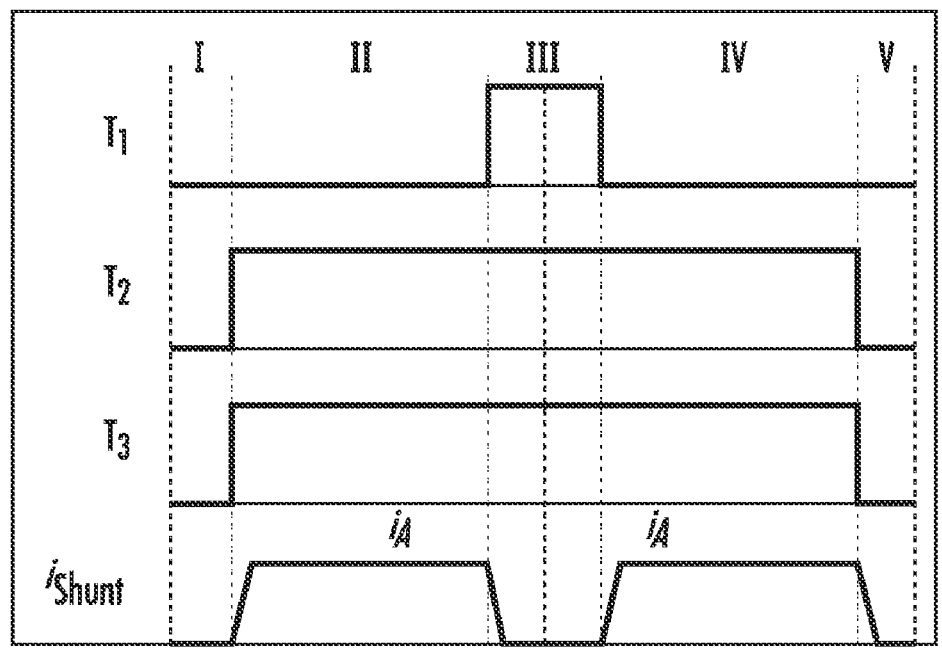
FIGS. 8 and 9 are center-aligned detailed pattern representations including also the pattern of the current on the single sensing resistor for the first critical condition of FIG. 5 and for the second critical condition of FIG. 6, respectively, according to the present invention.
Figure 9:
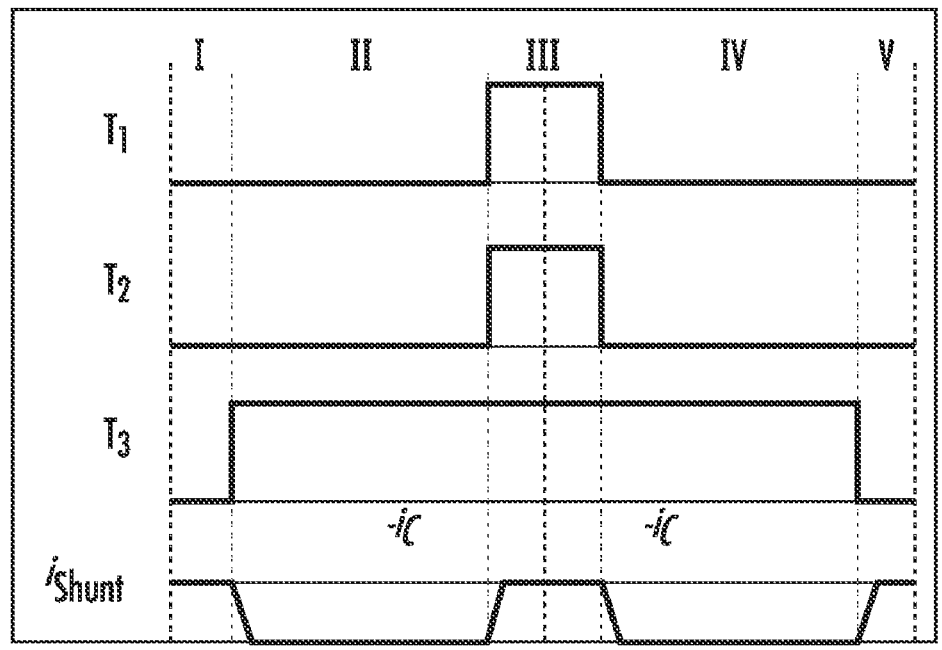

In case of the critical conditions of FIG. 5 and of FIG. 6, only two of the three duty cycles assume the same or very close values. This occurs when voltage demand vector comes to lie in the "blind" region in the neighborhood (by a difference smaller than DMIN) between two sectors of the hexagonally subdivided vector plane. When this occurs, the seven sub periods described in connection with the diagrams of FIG. 3, collapse to five only sub periods as represented in FIG. 8, for the critical condition of FIG. 6, and as represented in FIG. 9, for the critical condition of FIG. 5. As may be observed, only one phase current of the three can be correctly sampled on the single common DC-link current sensing resistor.

Figure 10:
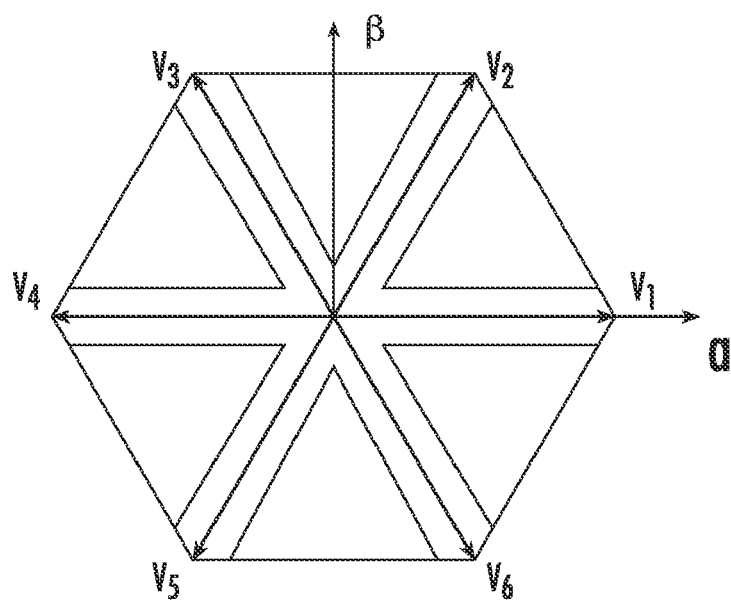
FIG. 10 shows the "blind" regions near the boundaries between adjacent sectors of the voltage vector plane, according to the present invention.
Figure 11:
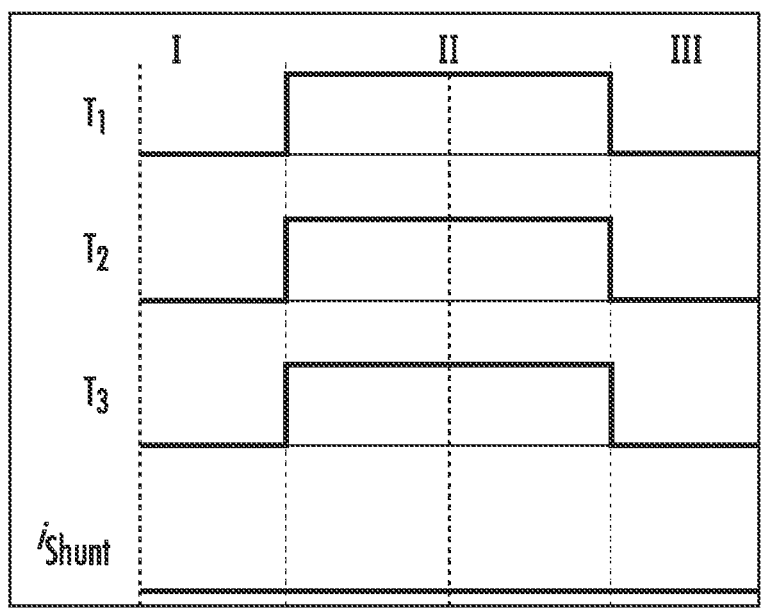
FIG. 11 is a pattern representation likely to occur at low values of the modulation index, according to the present invention.

FIG. 10 represents the six blind regions coinciding with the respective boundaries between two adjacent sectors of the α-β vector plane. In case a critical situation as discussed in relation to FIG. 7 occurs, as likely to occur when functioning at a relatively low modulation index, that is when the magnitude (modulus) of the voltage demand vector set by the controller is relatively small, the seven sub periods into which may normally be divided a PWM period collapse to three only sub periods and in all three sub periods the current flowing in the single common DC-link current sensing resistor may be null, as depicted in FIG. 11.

Figure 12:
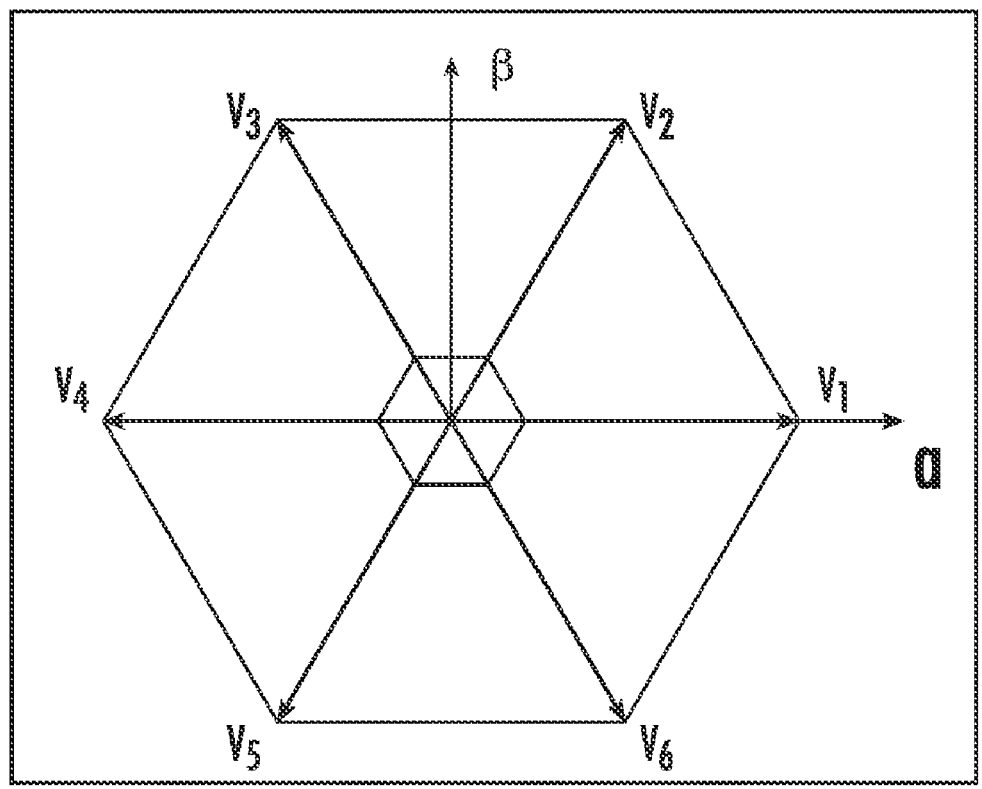
FIG. 12 shows the "blind" regions near the center of the voltage vector plane for low values of modulation index, according to the present invention.

Besides the preceding considerations, at low modulation index and/or when the magnitude of component state vectors becomes relatively small, it may become impossible to distinctly sense phase currents on the common sensing resistor when the demand voltage vector magnitude becomes as small as to lay inside the central gray area of the space vector diagram of FIG. 12.

According to the method of the present disclosure, depending from the result of the comparison of the current index of modulation with the minimum threshold value, the PWM pattern modifications that may be implemented whenever the system recognizes the occurrence of any of the above-discussed three critical conditions are selected from a number of alternatives.

As far as the modulation index remains greater than the minimum threshold value, a first and particular simple approach that is preferably selected automatically by the phase currents data acquisition sub-system, for modifying the PWM pattern is to invert one of the three PWM signals (channels) and complementing it in order to maintain unchanged the duty cycle during every PWM period and thus the voltage that is applied to the phase winding (x) that is proportional to DutyCycle$_x$·V$_{BUS}$. The PWM signal or channel that is inverted is the one having median duty cycle compared to the duty cycles of the other two channels.

Referring to the time diagrams of FIG. 3, for each sector the phase to be eventually inverted is identified in the following Table 2.

TABLE 2

| Sector | PWM inverted and complemented | Sector | PWM inverted and complemented |
| --- | --- | --- | --- |
| I | Ch2 | IV | Ch2 |
| II | Ch1 | V | Ch1 |
| III | Ch3 | VI | Ch3 |

Figure 13:
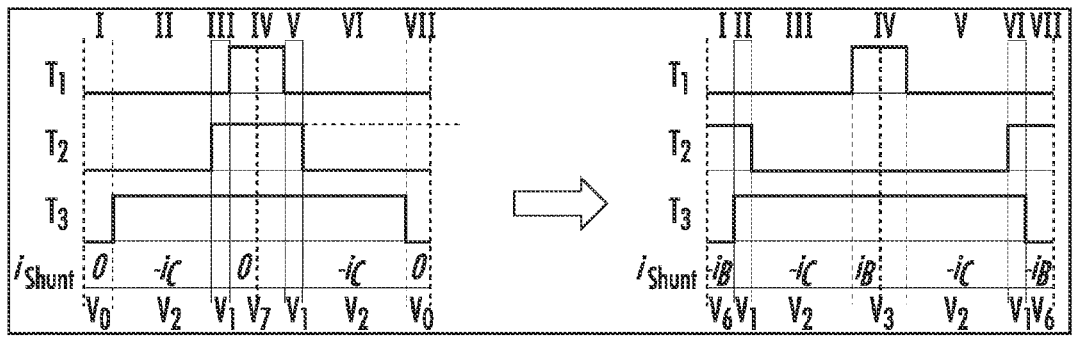
FIGS. 13 and 14 are center aligned PWM pattern representations showing a way according to the present invention through which distinct measurements of current relative to two phases are made possible, according to the present invention.

FIG. 13 illustrates the inversion-complementing technique for the case of the first critical condition a) discussed in connection with the diagram of FIG. 5 and for the case in which the V$_1$ vector is active for a time smaller than TMIN. By inverting and complementing the second channel T$_2$ it is possible to sample the current i$_c$ in the sub periods III and/or V and the phase current i$_B$ in the sub periods I and/or IV. In other words, the null V$_0$ and V$_7$ (vector) states are converted respectively to V$_6$ and V$_3$ (vector) states such that for the time these states last it is made possible to sample the two of three phase currents.

Figure 14:
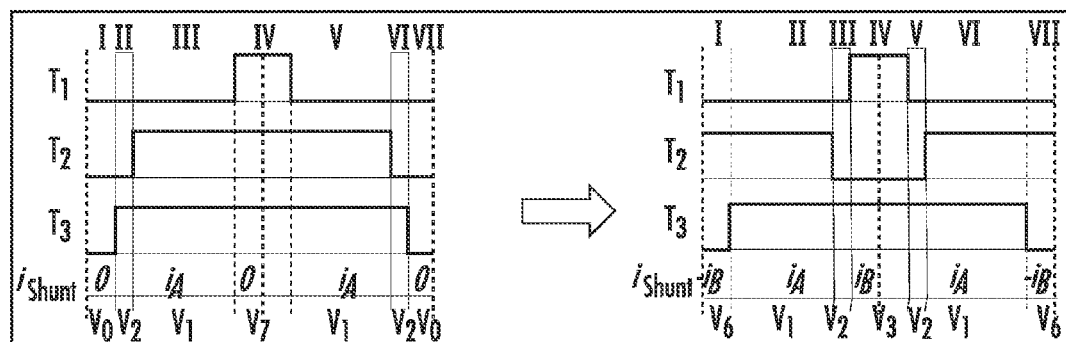

FIG. 14 illustrates the inversion-complementing technique for the case of the second critical condition b) discussed in connection with the diagram of FIG. 6 and for the case in which the V$_2$ vector is active for a time smaller than TMIN. By inverting and complementing the second channel T$_2$ it is possible to sample the current i$_A$ in the sub periods II and/or VI and the phase current i$_B$ in the sub periods I and/or IV.

Figure 15:
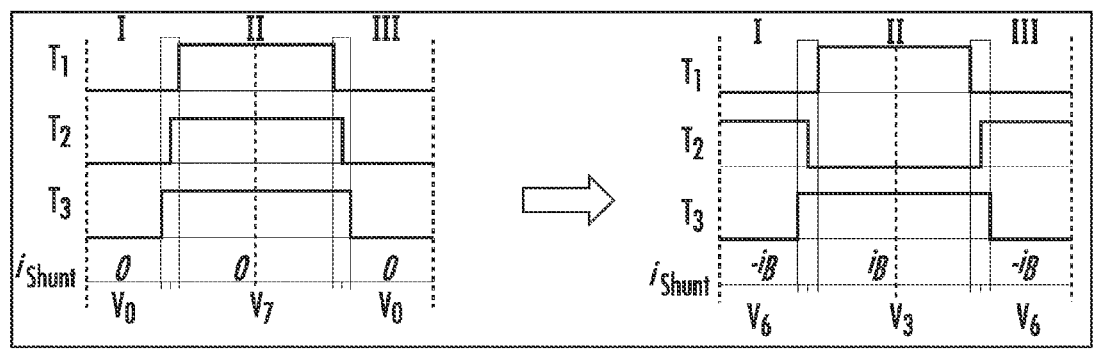
FIG. 15 shows how the measurement of current for one phase can be allowed under the third critical condition of FIG. 7, according to the present invention.

When the third critical condition c) discussed in connection to FIG. 7 occurs, the inversion and complementation for maintaining unchanged the duty cycle, of the second channel T$_2$ allows to sample one phase current, the phase current i$_B$, as illustrated in FIG. 15.

Therefore, in case of the critical condition c) as the one being considered, the inversion-complementing of one channel may not permit to distinctly sample at least two phase currents and the shortcoming needs to be resolved by implementing a second modification of the PWM pattern.

Figure 16:
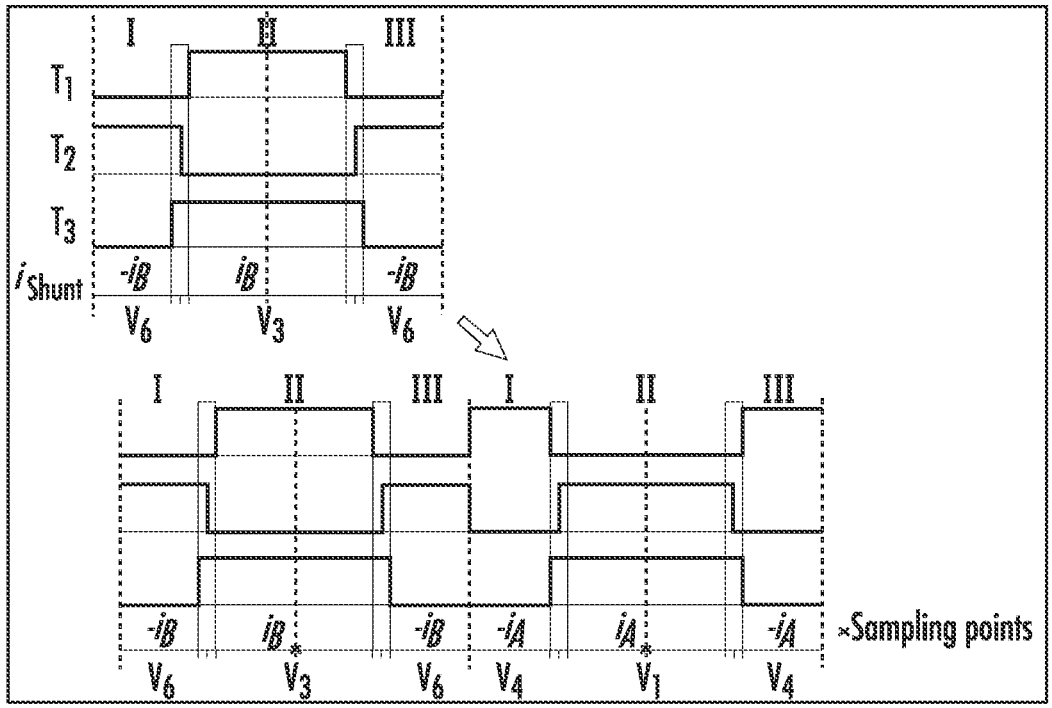
FIG. 16 shows a way of allowing distinct phase current measurements for two phases, one by inverting polarity as in FIG. 15, the other by modulating the duty cycle of another phase, according to the present invention.

According to a first embodiment the shortcoming is resolved by alternating the inversion and complementing of one channel during one PWM period and of another channel during the successive PWM period according to the intervention scheme depicted in FIG. 16 wherein the sampling instants of the current $i_{shunt}$ flowing in the single common DC-link current sensing resistor are indicated by crosses.

In the illustrated example of double inversion, during a first PWM period, the inverted and complemented channel is the second one $T_2$, as already illustrated in FIG. 15 thus making possible to sample the current $i_B$, while in the successive PWM period, the inverted and complemented channel is the first one $T_1$ thus making possible to sample the phase current $i_A$.

Figure 17:
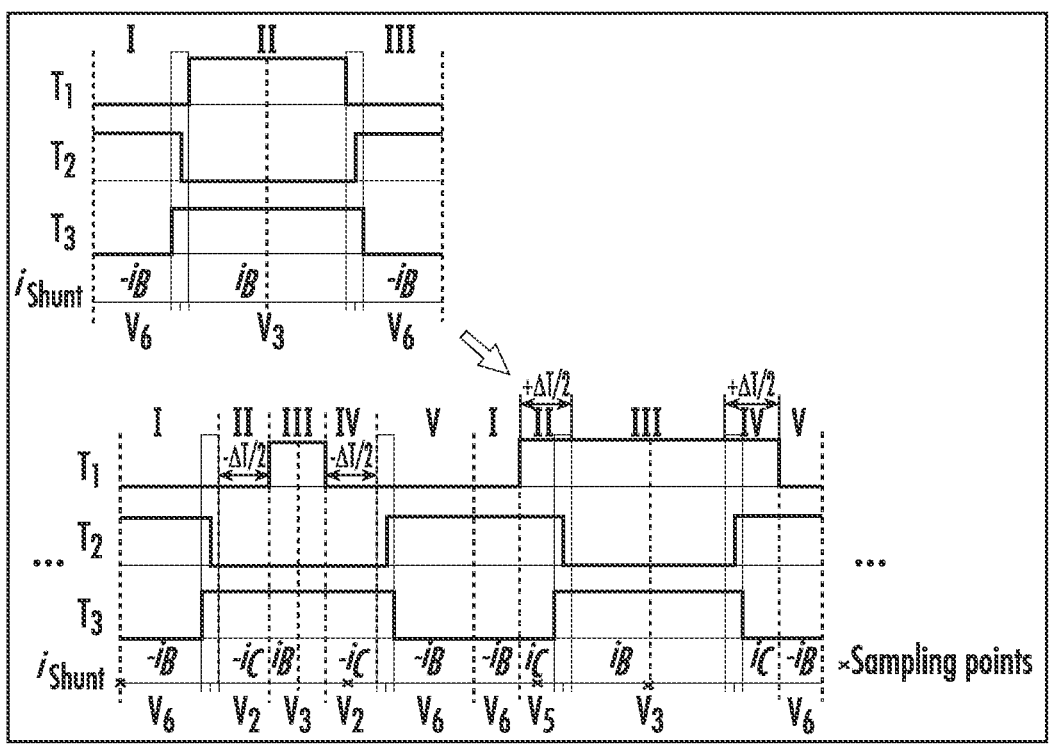
FIG. 17 shows an alternative way of allowing measurements of the current for two phases by alternating the inversion and complementation of the two PWM drive signals, according to the present invention.

According to an alternative embodiment, the shortcoming is resolved performing a duty cycle modulation of another channel besides performing the inversion and complementing of the second channel $T_2$, according to the intervention scheme depicted in FIG. 17, wherein the sampling instants of the current $T_{shunt}$ flowing in the single common DC-link current sensing resistor are indicated by crosses.

In the illustrated example of inversion-complementing of the second channel $T_2$, as already illustrated in FIG. 15, that makes it possible to sample the current $i_B$, the channel $T_1$ is subjected to a decrement by $\Delta T$ of its duty cycle in one PWM period, which makes possible to sample the current $i_C$, and in the successive PWM period its duty cycle is incremented of the same value $\Delta T$ for maintaining substantially unchanged the duty cycle of the PWM signal applied to the relative phase winding. Of course, the increment value $\Delta T$ may be sufficient to permit sampling of the current $i_C$ during both PWM periods.

Figure 18:
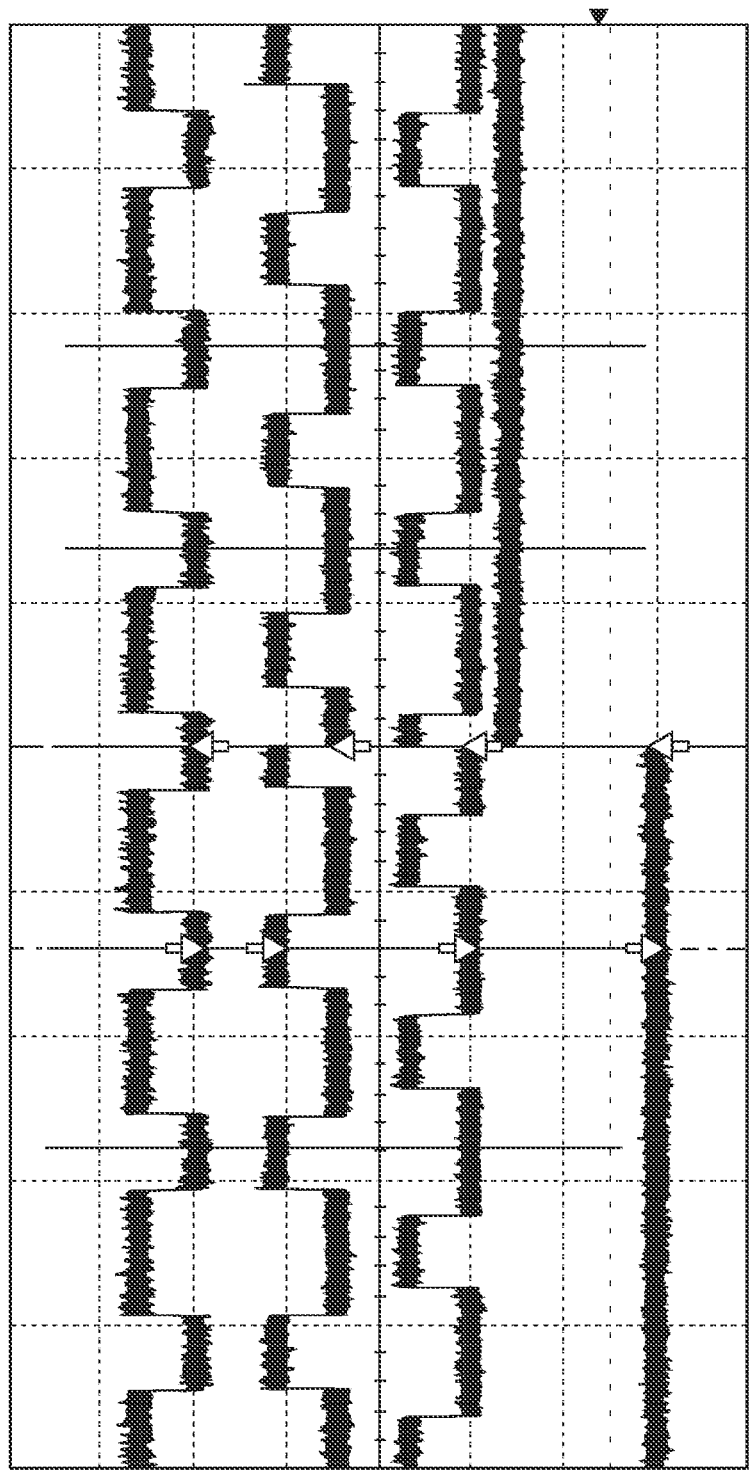
FIG. 18 is an oscilloscope acquisition of a PWM low-side switch control signal, relative to effecting the inversion at the transition between two adjacent sectors of the voltage vector plane, according to the present invention.

Discussion will now be directed to results of the practical implementation of the inverting-complementing technique at transitions. FIG. 18 includes oscilloscope acquisitions that show what happens at the limit region between two adjacent sectors of the vector space. The graphs relate to the situation in which, before the rising edge of C4, the complemented PWM signal is the one applied to the tap of the phase winding B (PWM phase B) while the other signals: PWM phase A and PWM phase C are not complemented. Upon the rising edge of C4, that is in passing from one sector to the next of the vector space, the complemented PWM signal is the one that is applied to the phase winding C (PWM phase C) while the other two signals are not complemented.

Figure 19:
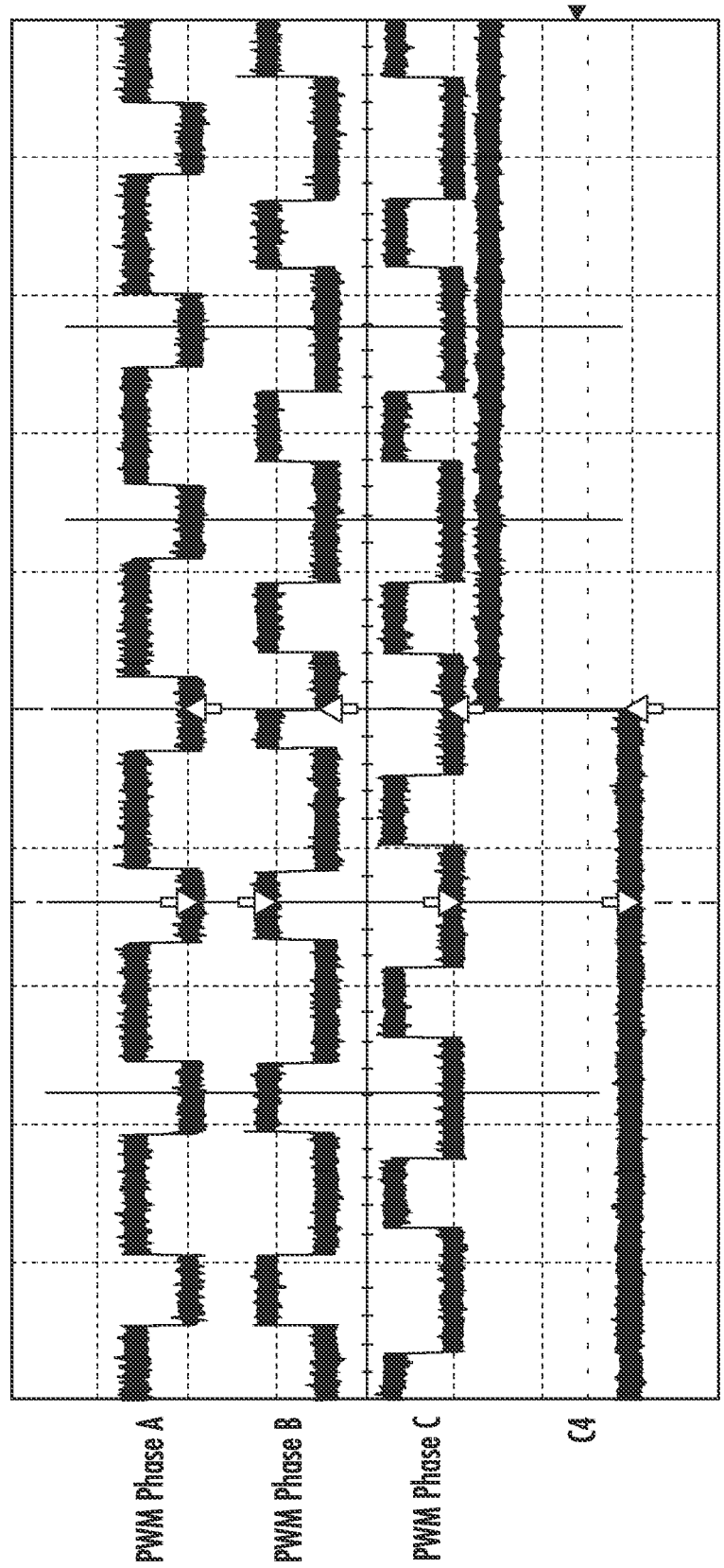
FIG. 19 is an oscilloscope acquisition of a PWM low-side switch control signal, relative to effecting the inversion at the transition between a critical region and a non critical region of the voltage vector plane, according to the present invention.

FIG. 19 shows what happens when passing from a critical condition of mutual duty cycle of the three phase PWM drive signals to a regular or non critical condition that would not prevent to perform distinct samplings of the phase currents on the single common DC-link sensing resistor. The rising edge of the channel C4 indicates the limit between the two conditions.

Before the rising edge of C4, the demand voltage vector lies in a critical region and in the case illustrated, the complemented PWM signal is the one that is applied to phase winding B (PWM phase B) while the other two drive signals PWM phase A and PWM phase C are not complemented. After the rising edge of C4, the demand voltage vector lies in a "regular" or non critical region and in this condition none of the three PWM signals is complemented.

Figure 20:
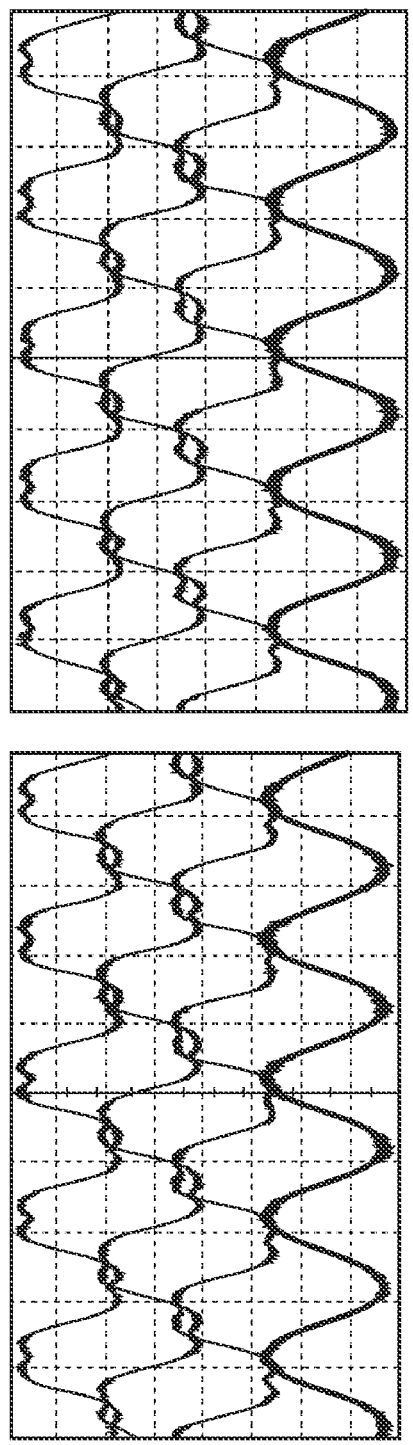
FIG. 20 is an oscilloscope acquisition that shows a comparison of phase voltages and current waveforms for an identical SVPWM modulation, without operating any inversion and complementing and operating inversion and complementing of one PWM drive signal, according to the present invention.

FIG. 20 provides a comparison between a normal PWM modulation and the modulation of the PWM drive signals according to the method of the present disclosure together with the waveform of the current flowing in one of the phase windings, namely in phase A. As may be noted, for relatively low voltage and high modulation index conditions, the method of the present disclosure does not appear to generate any macroscopic effect on the waveforms of the phase drive signals and of the resulting currents while allowing unimpeded current sampling on the single common DC-link current sensing resistor.

A different approach for modifying the PWM patterns is alternatively followed instead of the inversion-complementing approach and is automatically selected by the phase currents data acquisition sub-system whenever the current index of modulation becomes equal to or lesser than the minimum threshold value.

According to this alternative and eventually automatically selected approach, the discussed three distinct critical conditions in the ability of sampling distinctly the current flowing in at least two of the three phases of the motor are resolved according to an alternative approach based on purposely introducing an active vector sub period of sufficient duration such to permit current sampling on the single common DC-link current sensing resistor, in the null sub periods that in case of a space vector modulation are commonly called $V_0$ and $V_7$, and to compensate for such an insertion the affected PWM drive signal during the same PWM period.

Figure 21:
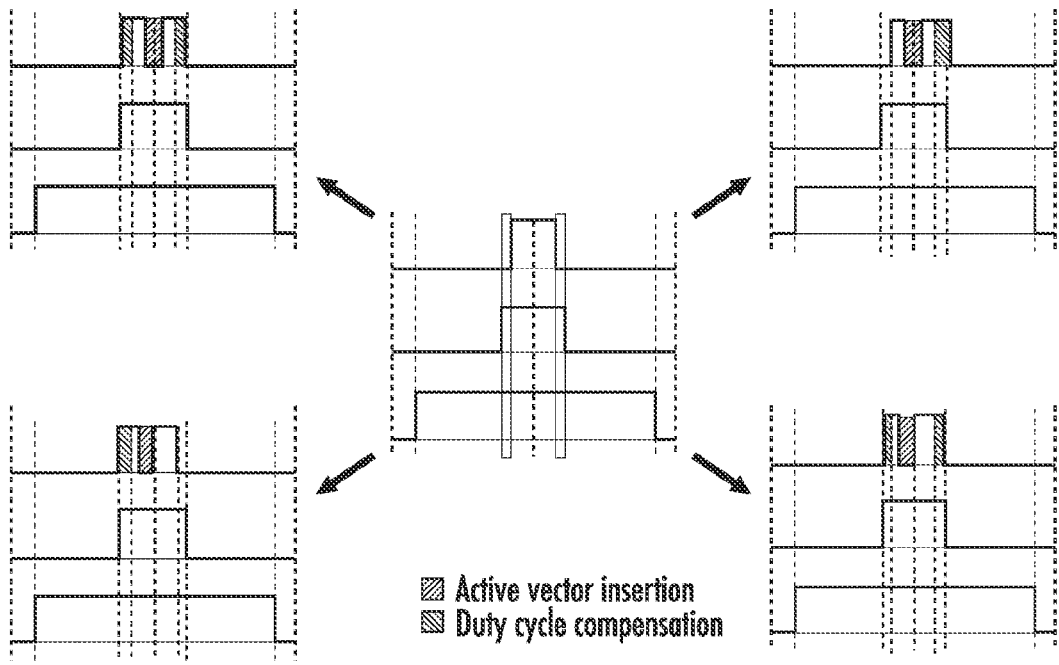
FIGS. 21, 22 and 23 illustrate alternative manners of implementing a fixed time active vector insertion and of correspondingly compensating for maintaining unvaried duty cycle during the PWM period, in resolving first and second critical pattern conditions, according to the present invention.

FIG. 21 illustrates four different ways of resolving the condition a) of FIG. 5. The active vector insertion and the corresponding duty cycle compensation are depicted by the respective different shaded areas in the four alternative implementations illustrated in the four alternative time diagrams.

Figure 22:
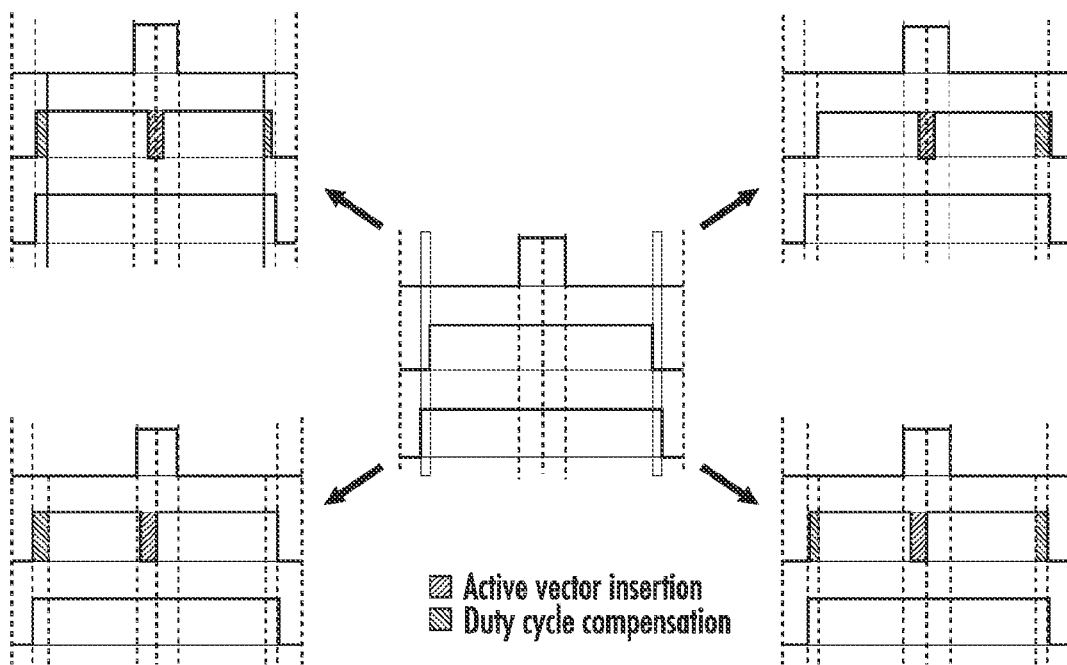
Figure 23:
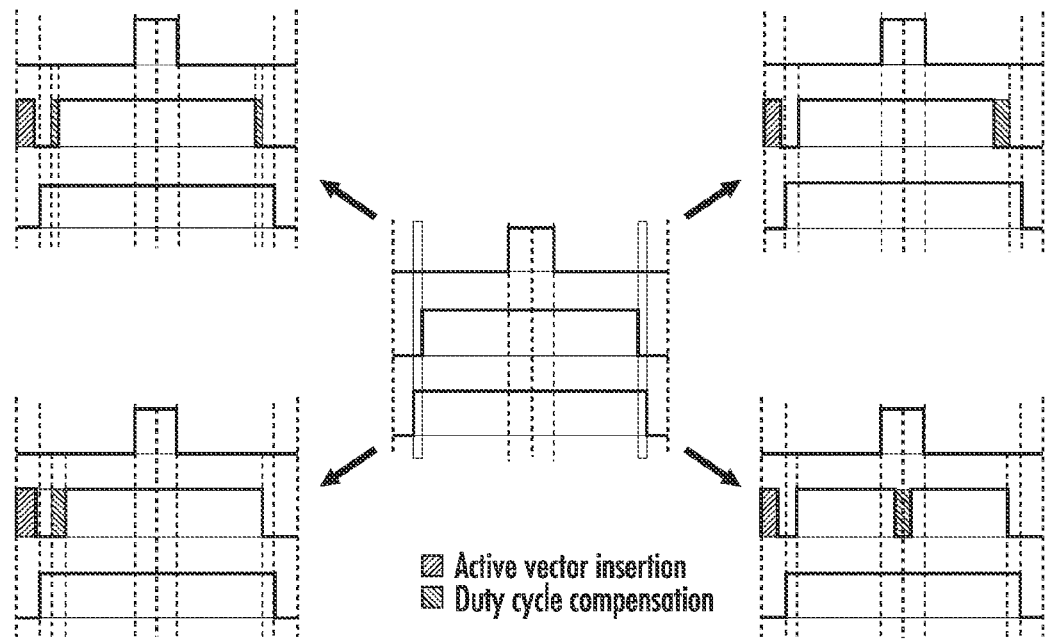

FIG. 22 is a similar representation of the four alternative ways of implementing the fixed time active vector insertion and of correspondingly compensating for maintaining unvaried the duty cycle during the PWM period, for resolving the condition b) of FIG. 6 by inserting the fixed time active vector used for sampling into the $V_7$ sector. FIG. 23 is a similar representation of the four alternative ways of implementing the fixed time active vector insertion and of correspondingly compensating for maintaining unvaried the duty cycle during the PWM period, for resolving the condition b) of FIG. 6 by inserting the fixed time active vector used for sampling into the $V_0$ sector.

Similarly to the needs that arise when using the approach of inversion-complementing, also when using this alternative or automatically selected approach, the third critical condition c) may be resolved by a fixed time active vector insertion technique alternately applied to two different phases (for example phase A and phase B), either by performing a single current reading or two current readings during the PWM period.

Figure 24:
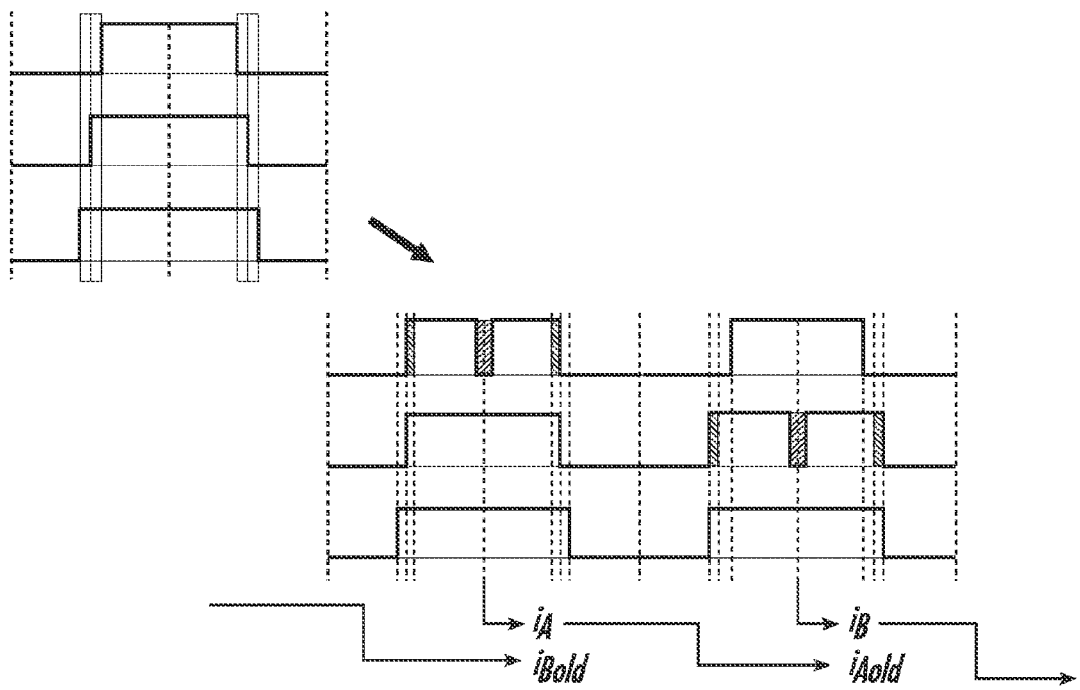
FIG. 24 illustrates a way of resolving a third critical pattern condition by fixed time active vector insertion and compensation in two phases in successive PWM periods with single current reading during each period, according to the present invention.

FIG. 24 illustrates the execution of the fixed time active vector insertion alternately into phase A and into phase B during successive PWM periods, thus carrying out a single current reading during each period, and compensating for leaving unchanged the duty cycle for the PWM period of fixed time distortion of one PWM phase drive signal.

In the example depicted in FIG. 24, during one PWM period the current is measured for the phase A, retaining valid the previously sampled value of the current of phase B ($i_{Bold}$) for computing the control parameter while in the successive PWM period the current in the phase B is measured, using the previously measured value $i_{Aold}$ of the current in the phase A for computing the control parameter.

Figure 25:
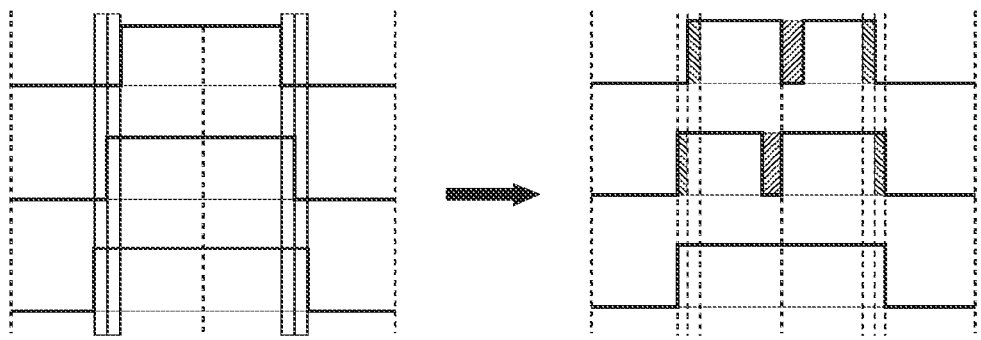
FIG. 25 illustrates a way of resolving a third critical pattern condition by fixed time active vector insertion and compensation in two phases in successive PWM periods with double current readings during the same PWM period, according to the present invention.

FIG. 25 illustrates an alternative implementation according to which two current readings are performed during the same PWM period (double current readings). The fixed time active vector insertion is effected on two different phases during the same PWM period (in the illustrated example in the phases A and B), ensuring that the fixed time inserted vectors in the two phases do not overlap. In this case, computation of the control parameter may consider the measured currents during each single PWM period.

Figure 26:
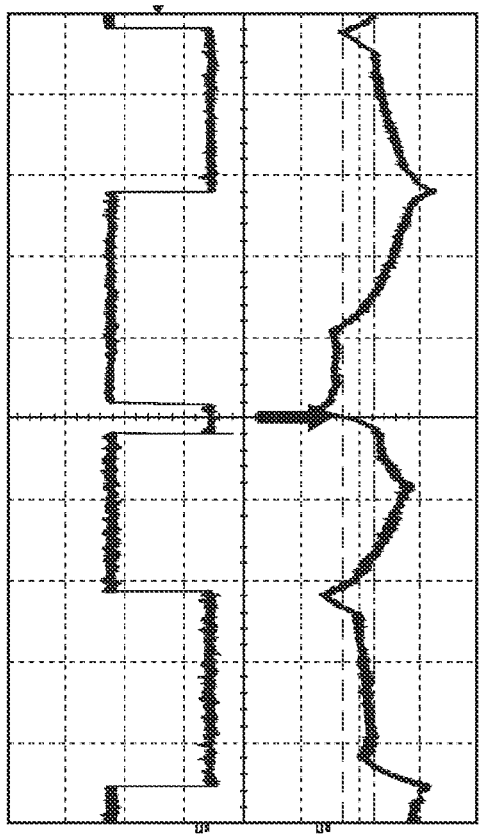
FIG. 26 are graphs showing the phase current distortion caused by the fixed time active vector insertion, according to the present invention.
Figure 26:
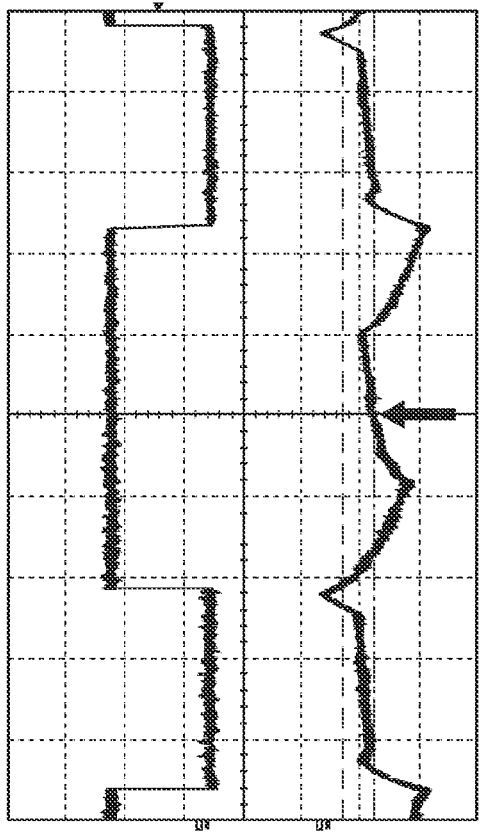

Insertion of a fixed time active vector into $V_7$ or $V_0$ sectors may introduce distortion in the related phase current as observable in the graphs of FIG. 26. The distortion may be compensated by monitoring the variation of the measured phase current upon passing from a "regular" pattern of the related PWM drive signal to a critical pattern condition wherein insertion of the fixed time active vector for permitting distinct sensing of at least two phase currents is performed. The measured variation of the phase current affected by the insertion is added or subtracted by appropriate adjustment of the relative duty cycle of the PWM drive signal as far as the fixed time active vector insertion condition persists.

Figure 27:
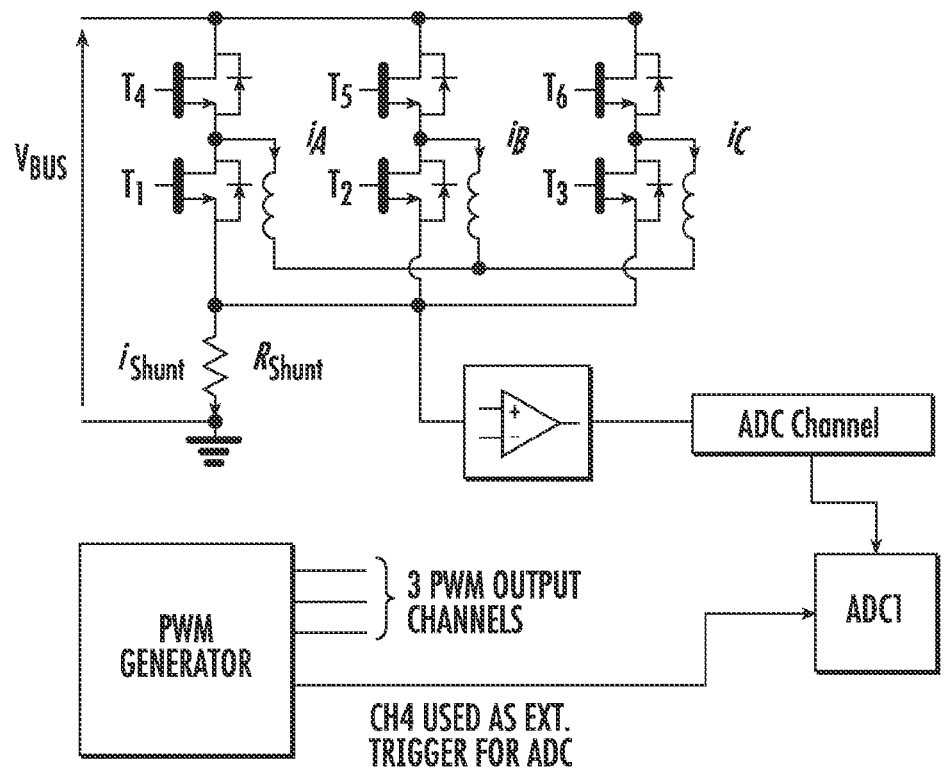
FIGS. 27 and 28 are circuit diagrams relative to embodiments contemplating either a single sampling operation or two distinct phase current sensing operations during a PWM period, respectively, according to the present invention.
Figure 28:
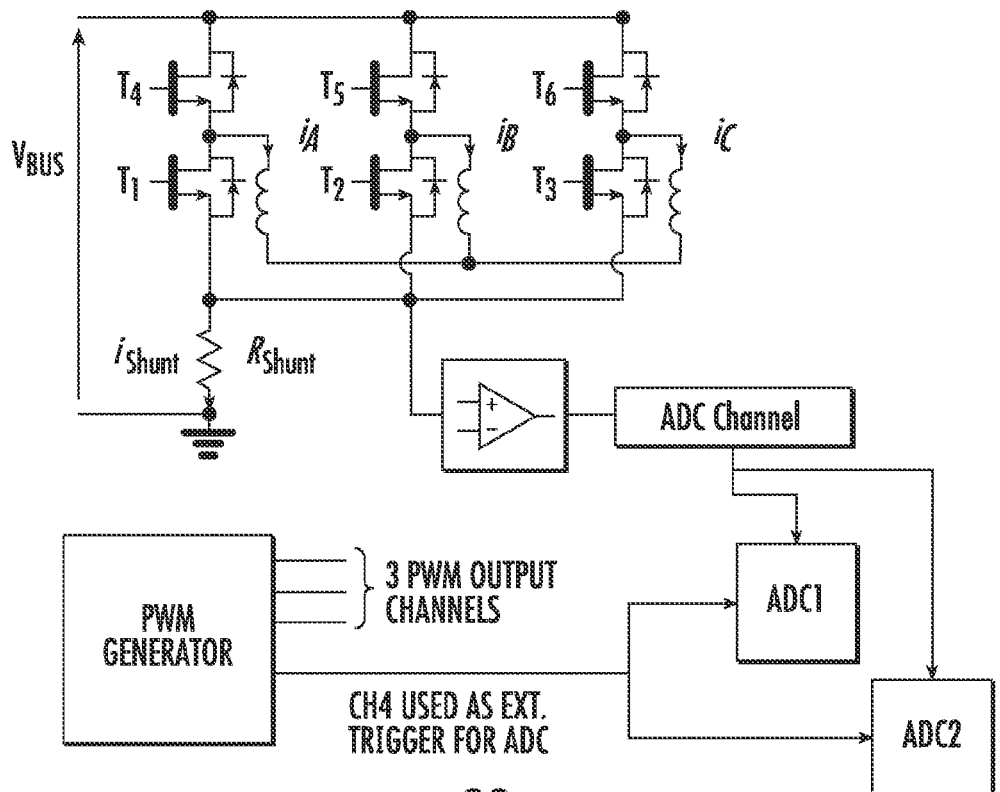

Discussion will now be directed to circuit implementation. FIG. 27 and FIG. 28 are circuit diagrams relative to embodiments contemplating the execution of two distinct phase current sensing operations during a PWM period, either using a single analog-to-digital converter (ADC) or using two converters (ADC1 and ADC2), respectively. The first circuit embodiment of FIG. 27 can be used only if for the contemplated application the two sampling instants may be temporally separated by more than the time taken for completing the conversion by the converter used, otherwise, use of two distinct converters are used, according to the embodiment of FIG. 28.

A dedicated fourth output channel (CH4) of the PWM Generator block is used to trigger the conversion by the ADC for sampling the sensed phase current. The two numerical values for the compare register related to the channel CH4 are pre-computed according to the motor control algorithm and become active (updated) in occurrence of a counter underflow (i.e. when the related counter reaches 0) and in occurrence of the counter overflow (when the related counter reaches the overflow register).

Figure 29:
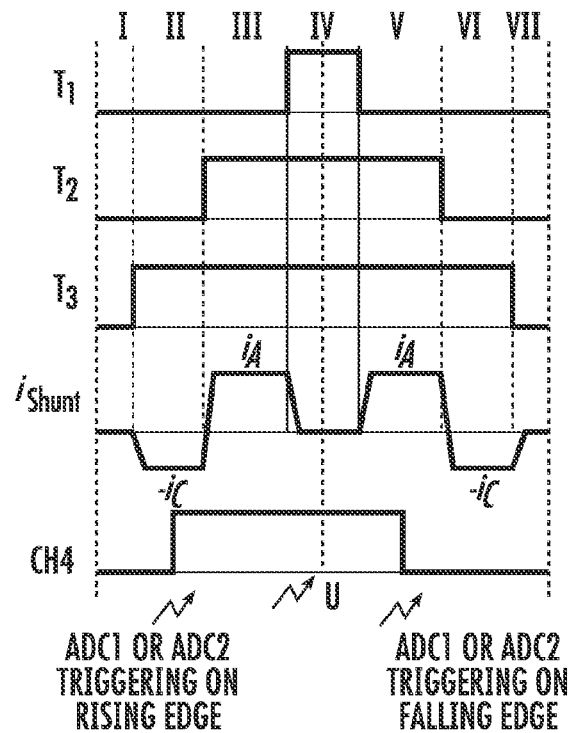
FIG. 29 illustrates the way of defining the sampling instant, according to the present invention.

Considering the fourth channel CH4 like yet another PWM channel (signal), the single controlled ADC1 of the circuit of FIG. 27 (and eventually also the second ADC2 of the circuit of FIG. 28) starts converting in coincidence of both rising and falling edges of such a fourth PWM signal CH4, as exemplarily depicted in FIG. 29.

Figure 30:
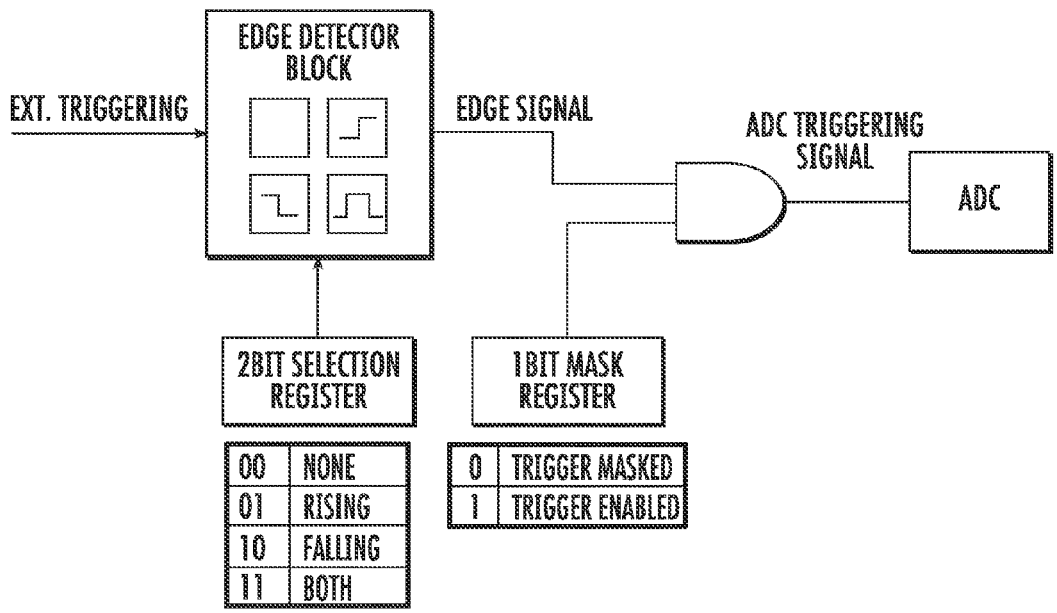
FIG. 30 exemplifies a suitable input network for triggering an analog-to-digital converter, according to the present invention.

This requirement may be satisfied, for example, by a triggering circuit network as the one exemplified in FIG. 30, though other equivalent circuits may be used.

Figure 31:
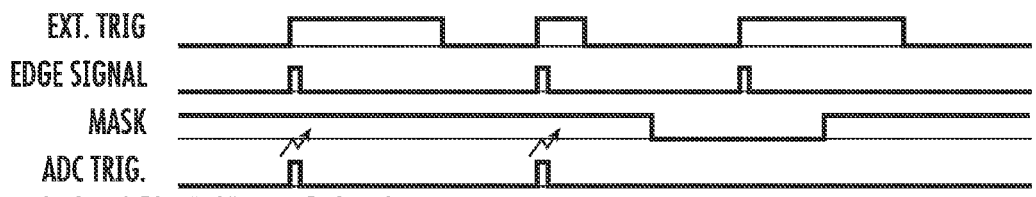
FIG. 31 shows timing diagrams for controlling the triggering of the ADC for different selections, according to the present invention.
Figure 31:
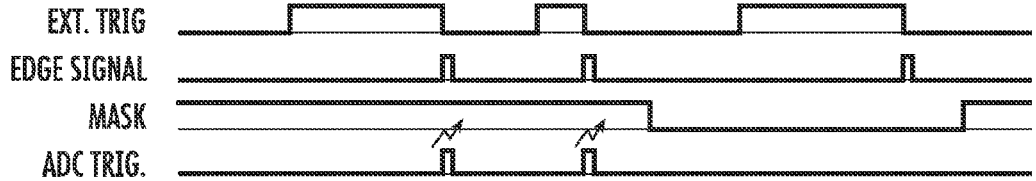
Figure 31:
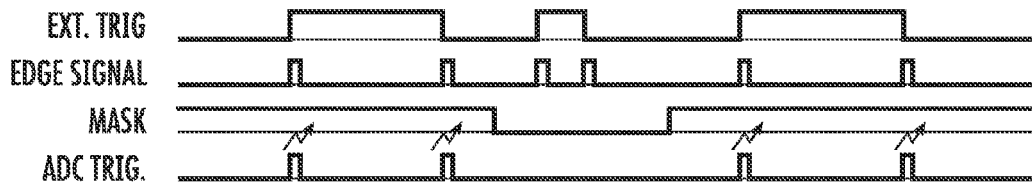

The Edge-Detector block detects the selected edge of the incoming external trigger signal (e.g. of CH4). The sensitivity of this block can be set by the user. The output of the Edge-Detector block is an edge signal that can be masked by the user to avoid undue starting of the ADC conversion. The interactions among the various signals, under different conditions, are depicted in the timing diagrams of FIG. 31.

Figure 32:
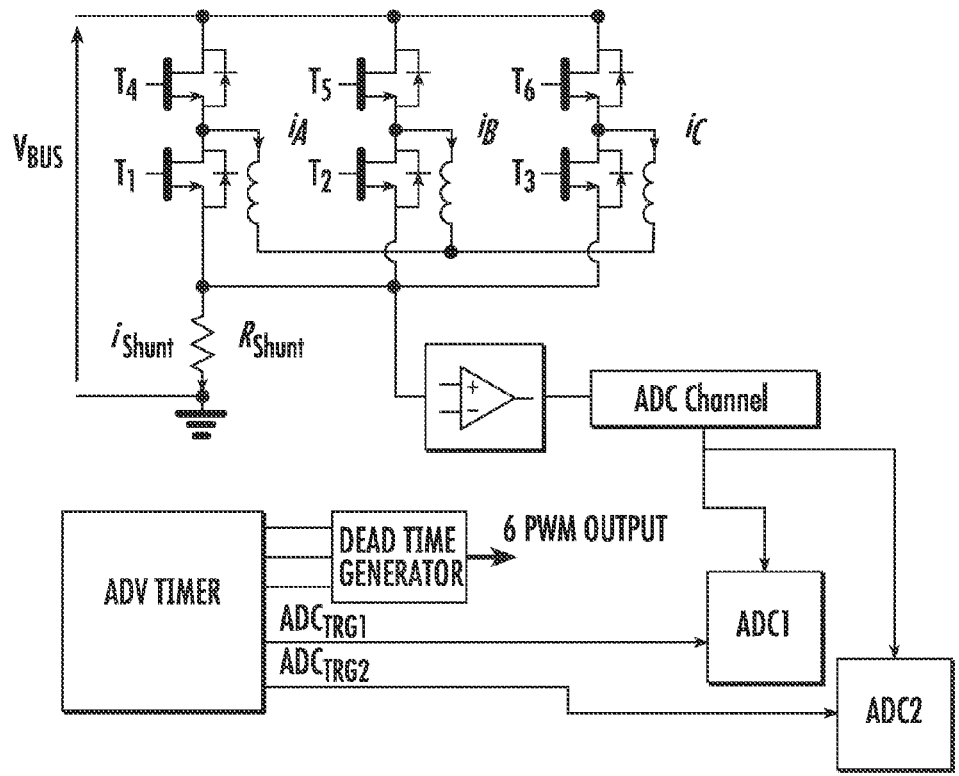
FIGS. 32 and 33 are alternative circuit diagrams of the phase current data acquisition sub-system, according to the present invention.
Figure 33:
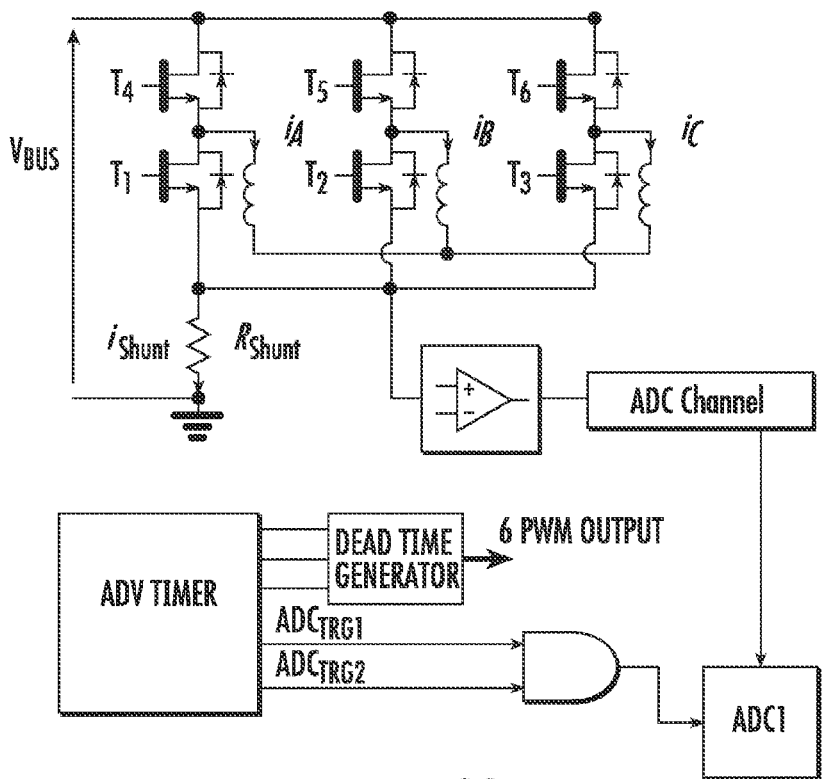

FIGS. 32 and 33 show two alternative circuit implementations; in both cases two triggering signals: Trg1 and Trg2, respectively. In the circuit of FIG. 32, two distinct converters, ADC1 and ADC2, triggered by the two signals, Trg1 and Trg2, respectively, are used. In the circuit of FIG. 33, a single converter, ADC1, is used and therefore the two triggering signals: Trg1 and Trg2, may be combined together.

According to this alternative circuit implementation, five registers may be used as compare registers for generating the three PWM phase drive signals and the two ADC triggering signals. The user may set up the PWM duty cycle values and the sampling point instants. Only one counter may be used for up-counting until it reaches the value of the overflow register and for down-counting to zero. The overflow register is used to set the PWM frequency.

Figure 34:
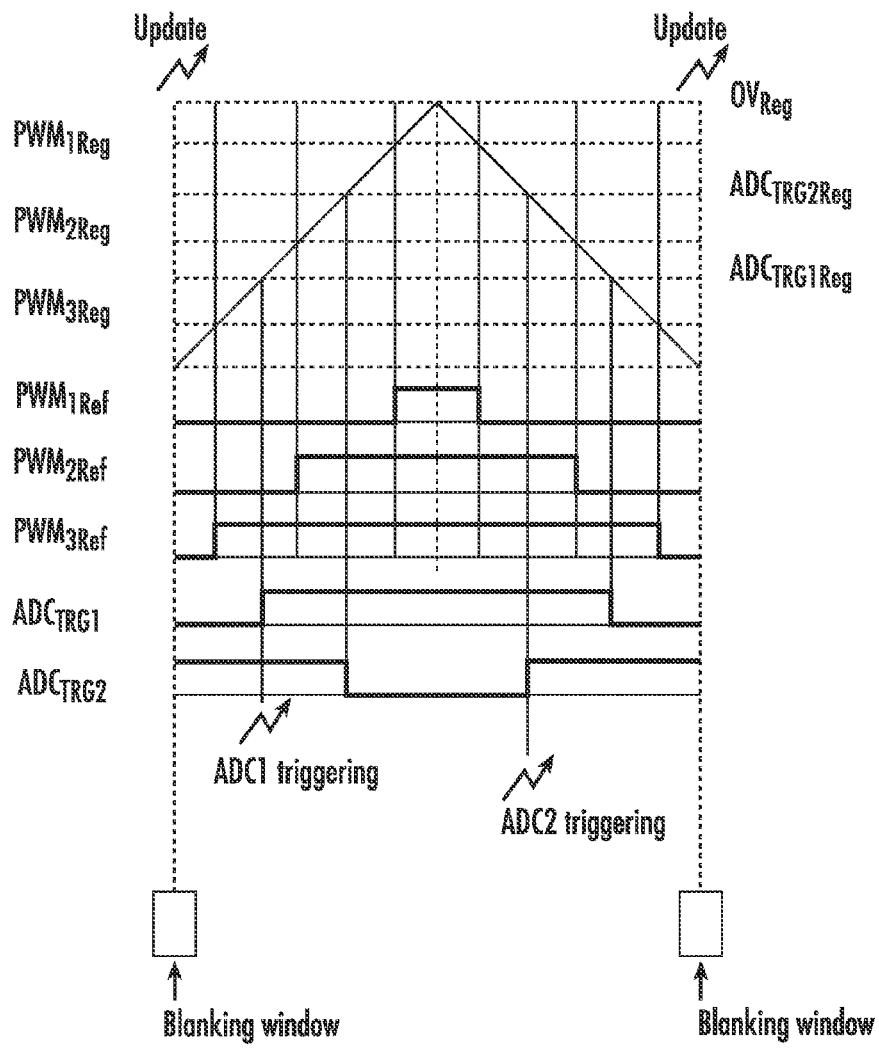
FIG. 34 shows the signal interactions for generating the three PWM signals and for setting the sampling instant during the PWM period, according to the present invention.

FIG. 34 shows some of the registers and the five signals output by the ADV-Timer block that generates the three PWM phase drive signals and the two ADC triggering signals that set the sampling points. Five more registers would also be used for selecting among different PWM modes. These five registers would be pre-load bit and become actual only after an Update event. The selection of the PWM mode "regular" would correspond to the condition according to which the reference signal is "0" if the counter is below (or equal) to the compare register, and "1" if the counter is above (greater than) the compare register. The selection of the PWM mode "inverted" would correspond to the condition according to which the reference signal is "1" if the counter is below (or equal) to the compare register, and "0" if the counter is above (greater than) the compare register. The selection of the PWM mode "toggle" would correspond to the condition in which the reference signal toggles between "0" and "1" when the counter becomes equal to the compare register.

In order to perform two samplings of the current during the same PWM period, the ADC may be triggered by a rising edge. Two blanking window zones may be inserted in proximity of the Update event in order to avoid unwanted ADC triggering caused by the inversion of the PWM mode. This may be accomplished by hardware means adapted to keeping "0" the ADC masking bit during the blanking window (FIG. 30 and FIG. 34).

Figure 35:
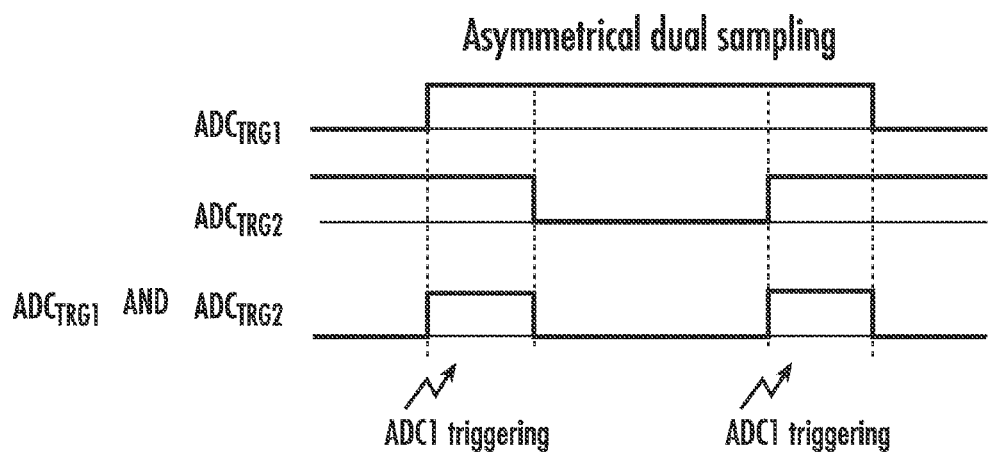
FIGS. 35 and 36 are diagrams showing alternative ways of setting the sampling instant, according to the present invention.
Figure 36:
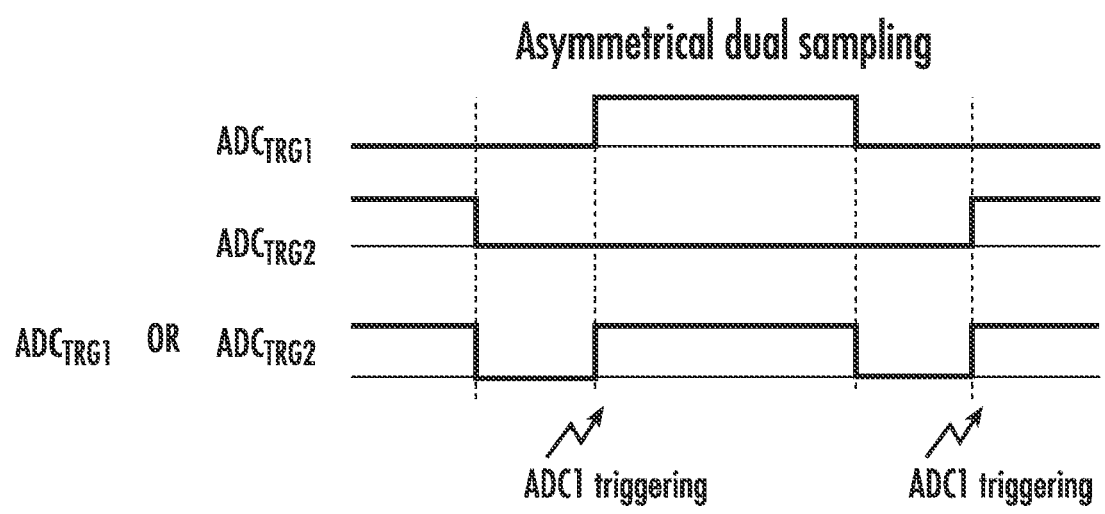

Finally, it is even possible to use a single ADC to perform two phase current sampling operations during a same PWM period, by using the suitably AND values of the two trigger signals (or the OR values). In this case, the single ADC may be triggered by a rising edge as diagrammatically depicted in FIG. 35 for the AND embodiment and in FIG. 36 for the OR embodiment. It would even be possible to trigger a single ADC four times per period using both the rising and the falling edges of the AND values or of the OR values.

Figure 37:
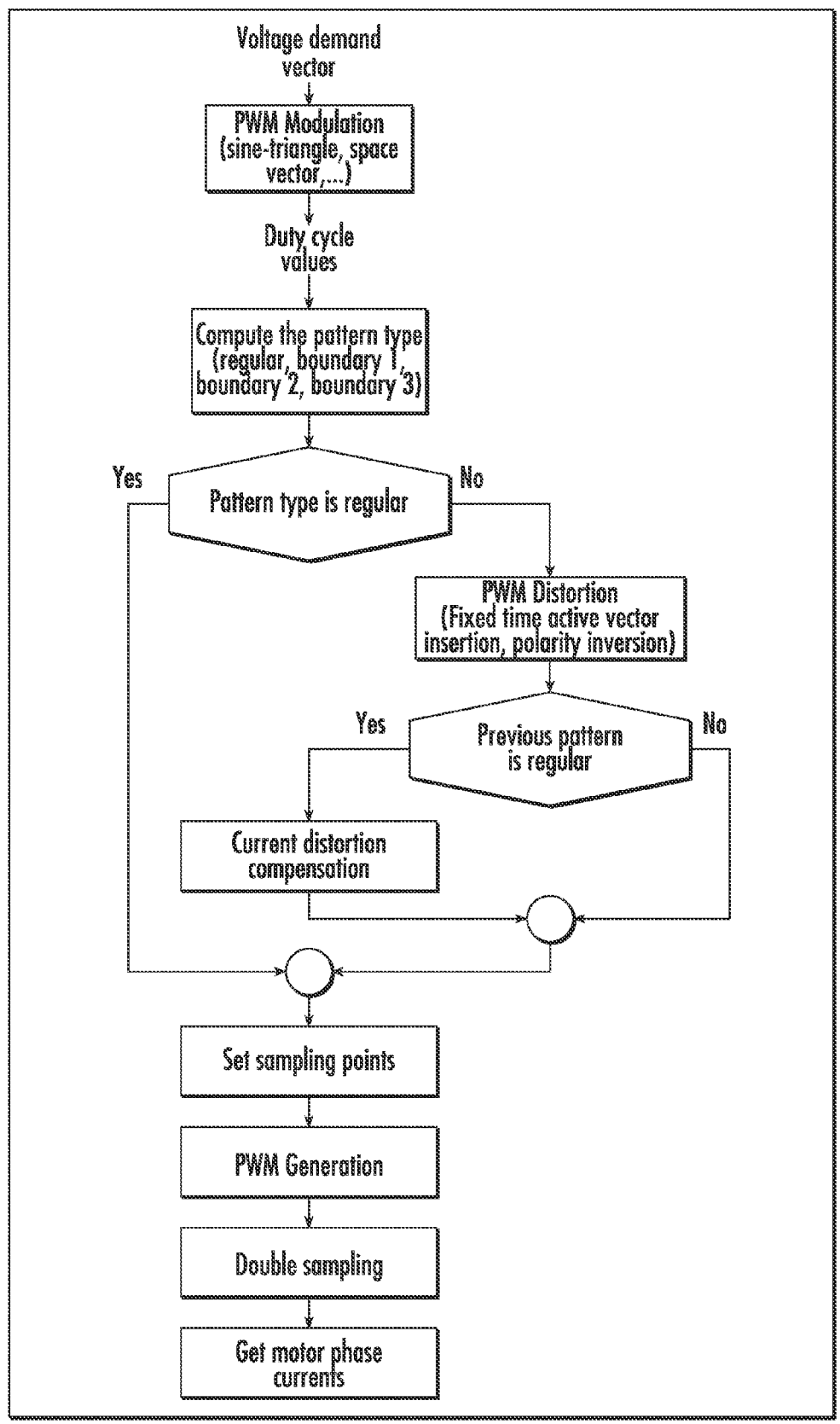
FIGS. 37 and 38 are a general flow chart and a detail flow chart of the phase current data acquisition sub-system of the present invention, according to the present invention.
Figure 38:
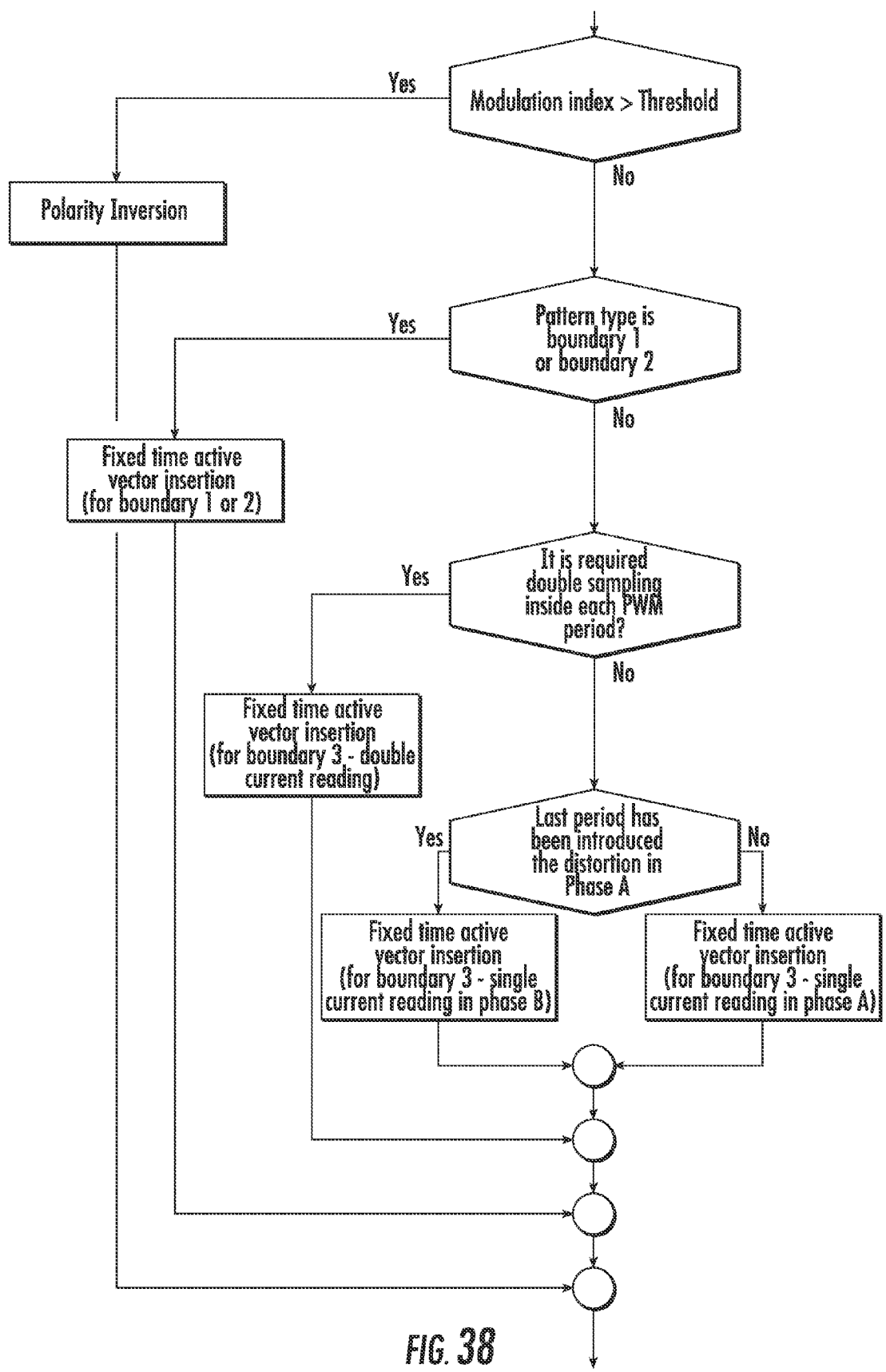

FIG. 37 is a general flowchart of the phase current data acquisition sub-system of this invention. Details of the block PWM_Distortion of the general flowchart of FIG. 37 are illustrated in the flow chart of the block depicted in FIG. 38.

That which is claimed:
1. A method for sampling data for each phase of a three-phase inverter driving a motor, the three-phase inverter being controlled by three pulse width modulated (PWM) drive signals, each PWM drive signal having a respective duty cycle, the duty cycles being set by a controller for corresponding phase windings of the motor, the sampling being based upon a common direct current (DC)-link current resistor, the method comprising:
  computing an index of modulation for each of the three PWM drive signals for a current demand voltage vector set by a motor controller and comparing it with a threshold value;
  if the respective duty cycle of one of the three PWM drive signals differs from the duty cycle of the other two PWM drive signals by less than a minimum value, thereby impeding sampling of the DC-link current of at least two of the three PWM drive signals and if so, then determining which of the following three conditions is true
    a) the duty cycles of at least two of the PWM drive signals differ by less than the minimum value and the duty cycle of the third PWM drive signal is greater than the duty cycles of the other two, b) the duty cycles of at least two of the PWM drive signals differ by less than the minimum value and the duty cycle of the third PWM drive signal is smaller than the duty cycles of the other two, or c) the duty cycles of the three PWM drive signals differ among each other by less than the minimum value; and when at least one of the conditions a), b), and c) is true, then creating sampling windows for sampling at least two phase currents by performing at least one of inverting and complementing at least one of the PWM drive signals, and inserting a fixed time active vector in null sub-intervals of at least one of the PWM drive signals and maintaining a compound duty cycle over every PWM period of the affected signal, the inserting being based upon the comparison of the index of modulation with the threshold value and true condition.

2. The method according to claim 1 wherein when at least one of conditions a) and b) is true and when the modulation index is greater than the threshold value, then the PWM drive signal being inverted and complemented for maintaining its duty cycle is the signal of median duty cycle among the three PWM drive signals.

3. The method according to claim 2 wherein when either condition c) is true or when the modulation index is greater than the threshold value, then a second PWM drive signal is inverted and complemented alternately to the signal of median duty cycle among the three PWM drive signals during successive PWM periods.

4. The method according to claim 2 wherein when condition c) is true and the modulation index is greater than the threshold value, then a first phase current measurement is made by inverting and complementing the PWM drive signal of median duty cycle and at least one other phase current measurement is made by decrementing the duty cycle of a second PWM drive signal by a set amount during a PWM period and incrementing its duty cycle by the set amount during a successive PWM period.

5. The method according to claim 1 wherein when at least one of condition a) and b) is true and when the modulation index is greater than the threshold value, an additional active vector of fixed time duration equal to the minimum value is introduced in a null sub-interval of one of the three PWM drive signals by inverting a sign of the signal in the null sub-interval and compensating total duty cycle of the signal in the same PWM period for unchanged voltage demand vector actuation.

6. The method according to claim 1 wherein when condition c) is true and the modulation index is less than or equal to the threshold value, then an additional active vector of fixed time duration equal to the minimum value is introduced in a null sub-interval of at least two of the three PWM drive signals alternately during successive PWM periods, each time by inverting a sign of the signal in the null sub-interval and compensating total duty cycle of the signal in the same PWM period for unchanged voltage demand vector actuation.

7. The method according to claim 6 wherein the additional active vector is adjacent to a midpoint of the PWM period of the affected PWM drive signal; and wherein duty cycle compensation comprises spacing apart the respective leading and trailing edges of the PWM drive signal by the fixed time duration.

8. The method according to claim 1 wherein when condition c) is true and when the modulation index is equal or less than the threshold value, then an additional active vector of fixed time duration equal to the minimum value is introduced in a null sub-interval of at least two of the three PWM drive signals during the same PWM period by at least:

inverting a sign of a respective signal in the null sub-interval;

compensating the total duty cycle of the signal in the same PWM period for unchanged voltage demand vector actuation; and performing two distinct current sensing operations during the same PWM period.

9. The method according to claim 1 further comprising:

compensating for detected current distortion introduced when at least one of the conditions a), b), and c) is true, the detected current distortion being based upon modifications of at least two of the three PWM drive signals for creating sampling windows for sampling of at least two phase currents, as detected based upon variation of measured phase current passing from normal condition to at least one of the conditions a), b), and c), and by adding or subtracting the detected current difference while at least one of conditions a), b), and c) is true.

10. A method for sampling phase currents in a three-phase inverter being controlled by three pulse width modulated (PWM) signals with corresponding duty cycles, using a common resistor sampling a direct current (DC)-link current, the method comprising:

computing an index of modulation for each of the three PWM signals for a current demand voltage vector and comparing it with a threshold value;

if the respective duty cycle of one of the three PWM signals differs from the duty cycle of the other two PWM signals by less than a minimum value, then determining which of the following three conditions is true a) the duty cycles of at least two of the PWM signals differ by less than the minimum value and the duty cycle of the third PWM signal is greater than the duty cycles of the other two, b) the duty cycles of at least two of the PWM signals differ by less than the minimum value and the duty cycle of the third PWM signal is smaller than the duty cycles of the other two, or c) the duty cycles of the three PWM signals differ among each other by less than the minimum value; and when at least one of the conditions a), b), and c) is true, then creating sampling windows for sampling at least two phase currents by performing at least one of inverting and complementing at least one of the PWM signals, and inserting a fixed time active vector in null sub-intervals of at least one of the PWM signals and maintaining a compound duty cycle over every PWM period of the affected signal, the inserting being based upon the comparison of the index of modulation with the threshold value and true condition.

11. The method according to claim 10 wherein when at least one of conditions a) and b) is true and when the modulation index is greater than the threshold value, then the PWM signal being inverted and complemented for maintaining its duty cycle is the signal of median duty cycle among the three PWM signals.

12. The method according to claim 11 wherein when either condition c) is true or when the modulation index is greater than the threshold value, then a second PWM signal is inverted and complemented alternately to the signal of median duty cycle among the three PWM signals during successive PWM periods.

13. The method according to claim 11 wherein when condition c) is true and the modulation index is greater than the threshold value, then a first phase current measurement is made by inverting and complementing the PWM signal of median duty cycle and at least one other phase current measurement is made by decrementing the duty cycle of a second PWM signal by a set amount during a PWM period and incrementing its duty cycle by the set amount during a successive PWM period.

14. A system for sampling current data for each phase of a three-phase inverter driving a motor, the three-phase inverter controlled based upon three PWM drive signals having corresponding duty cycles as set by a motor control system for respective phase windings of the motor, the system comprising:
 a resistor periodically sampling direct current (DC)-link current;
 a sense amplifier coupled to said resistor and for outputting a signal representing a voltage drop on said resistor;
 at least one analog-to-digital converter (ADC) for receiving the signal output by said sense amplifier, for operating based upon a trigger signal to convert the signal output by said sense amplifier to numerical values supplied to the motor control system;
 a pulse width modulated (PWM) drive signal generator circuit for generating the three PWM drive signals and at least a fourth PWM drive signal as the trigger signal; and
 a controller for
  computing an index of modulation for each of the three PWM drive signals for a current demand voltage vector and comparing it with a threshold value,
  when the duty cycle of at least one of the three PWM drive signals differs from the duty cycle of any of the other two by less than a minimum value, thereby impeding sampling of the current on said resistor of at least two of the three PWM drive signals and if so, then determining which of the following three conditions is true
   a) the duty cycles of at least two of the PWM drive signals differ by less than the minimum value and the duty cycle of the third PWM drive signal is greater than the duty cycles of the other two,
   b) the duty cycles of at least two of the PWM drive signals differ by less than the minimum value and the duty cycle of the third PWM drive signal is less than the duty cycles of the other two, or
   c) the duty cycles of all three of the PWM drive signals differ among each other by less than the minimum value;
  when at least one of the conditions a), b), and c) is true, for creating sensing windows for sampling at least two phase currents and modulating the fourth PWM drive signal to act as a trigger signal of said at least one ADC by performing at least one of
   inverting and complementing at least one of the PWM drive signals, and
   inserting a fixed time active vector in null sub-intervals of at least one of the PWM drive signals and maintaining a compound duty cycle over every PWM period of the affected signal,
   the inserting being based upon the comparison of the index of modulation with the threshold value and the true condition.

15. The system according to claim 14 wherein said at least one ADC is triggered by leading and trailing edges of the single modulated fourth PWM drive signal; and further comprising:
 a triggering circuit having an input coupled to said at least one ADC; and
 an edge detector circuit receiving the fourth PWM drive signal and outputting an edge signal based upon a state of a selection 2-bit register and a combinatory logic AND circuit for masking the edge signal based upon a logic state of a toggling register.

16. The system according to claim 14 wherein said at least one ADC comprises at least two thereof; and wherein the motor control system includes a PWM drive signal generator circuit generating said three PWM drive signals and at a fourth and a fifth PWM drive signal for respective triggering signals to said first and second ADCs.

17. The system according to claim 16 wherein a combinatory logic circuit combines the fourth and fifth PWM drive signals into a trigger signal for a single converter to perform distinct sensing operations of at least two phase currents during a PWM period.

18. A system for sampling phase current data for each phase of a three-phase inverter operating based upon three PWM signals having corresponding duty cycles, the system comprising:
 a resistor periodically sampling direct current (DC)-link current for each phase of the three-phase inverter;
 a sense amplifier coupled to said resistor and for outputting a signal representing a voltage drop on said resistor; and
 a controller cooperating with said resistor and said sense amplifier for
  computing an index of modulation for each of the three PWM signals for a current demand voltage vector and comparing it with a threshold value,
  if the duty cycle of at least one of the three PWM signals differs from the duty cycle of any of the other two by less than a minimum value, then determining which of the following three conditions is true
   a) the duty cycles of at least two of the PWM signals differ by less than the minimum value and the duty cycle of the third PWM signal is greater than the duty cycles of the other two,
   b) the duty cycles of at least two of the PWM signals differ by less than the minimum value and the duty cycle of the third PWM signal is less than the duty cycles of the other two, or
   c) the duty cycles of all three of the PWM signals differ among each other by less than the minimum value, and
  when at least one of the conditions a), b), and c) is true, then performing at least one of
   inverting and complementing at least one of the PWM signals, and
   inserting a fixed time active vector in null sub-intervals of at least one of the PWM signals and maintaining a compound duty cycle over every PWM period of the affected signal,
   the inserting being based upon the comparison of the index of modulation with the threshold value and the true condition.

19. The system according to claim 18 further comprising an analog-to-digital converter (ADC); and wherein said controller is also for when at least one of the conditions a), b), and c) is true, then for creating sensing windows for sampling at least two phase currents and modulating a fourth PWM signal to act as a trigger signal of said at least one ADC.

20. The system according to claim 19 wherein said at least one ADC is triggered by leading and trailing edges of the fourth PWM signal; and further comprising:

a triggering circuit having an input coupled to said at least one ADC; and an edge detector circuit receiving the fourth PWM signal and outputting an edge signal based upon a state of a selection 2-bit register and a combinatory logic AND circuit for masking the edge signal based upon a logic state of a toggling register.

21. The system according to claim 19 wherein said at least one ADC comprises at least two thereof; and wherein a motor control system includes a PWM signal generator circuit generating said three PWM signals and the fourth, and a fifth PWM signal for respective triggering signals to said first and second ADCs.

22. The system according to claim 21 wherein a combinatory logic circuit combines the fourth and fifth PWM signals into a trigger signal for a single converter to perform distinct sensing operations of at least two phase currents during a PWM period.

* * * * *